US012769802B2

(12) United States Patent
Sulser et al.

(10) Patent No.: US 12,769,802 B2
(45) Date of Patent: Oct. 20, 2026

(54) ENHANCING VISION LANGUAGE MODEL UNDERSTANDING VIA VISUAL SEARCH SERVICE-DERIVED ANNOTATIONS

(71) Applicant: Google LLC, Mountain View, CA (US)

(72) Inventors: Fabio Luca Sulser, Zurich (CH); Susan Qi Xu, San Francisco, CA (US); Vikas Bahirwani, Sunnyvale, CA (US); Bhanu Prakash Reddy Guda, Sunnyvale, CA (US); Lin Li, Sunnyvale, CA (US); Khalid Salama, Zurich (CH); Manuel Tragut, Zug (CH); Ágoston Weisz, Pfäffikon Schwyz (CH); Andrea Colaco, Los Altos, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 19/017,157

(22) Filed: Jan. 10, 2025

(65) Prior Publication Data

US 2026/0203363 A1 Jul. 16, 2026

(51) Int. Cl.
*G06F 16/9538* (2019.01)
*G06F 16/532* (2019.01)

(52) U.S. Cl.
CPC ........ *G06F 16/9538* (2019.01); *G06F 16/532* (2019.01)

(58) Field of Classification Search
CPC .......................... G06F 16/9538; G06F 16/532
See application file for complete search history.

(56) References Cited

U.S. PATENT DOCUMENTS

| | | | | |
|---|---|---|---|---|
| 2021/0256053 | A1* | 8/2021 | Soppin | G06T 3/40 |
| 2025/0181631 | A1* | 6/2025 | Chaudhary | G06F 16/532 |
| 2025/0217407 | A1* | 7/2025 | Wang | G06F 16/587 |
| 2025/0291863 | A1* | 9/2025 | Ho | G06F 16/9538 |

OTHER PUBLICATIONS

Yang et al., "Set-of-Mark Prompting Unleashes Extraordinary Visual Grounding in GPT-4V", arXiv:2310.11441v2, Nov. 6, 2023, 23 pages.
International Search Report and Written Opinion for Application No. PCT/US2026/010260, mailed Mar. 31, 2026, 13 pages.
Li et al., "Benchmarking Multimodal Retrieval Augmented Generation with Dynamic VQA Dataset and Self-Adaptive Planning Agent", arXiv:2411.02937v3, Dec. 8, 2024, 24 pages.

* cited by examiner

*Primary Examiner* — Aleksandr Kerzhner
*Assistant Examiner* — Aryan D Toughiry
(74) *Attorney, Agent, or Firm* — DORITY & MANNING, P.A.

(57) ABSTRACT

Provided are computer-implemented systems and methods for responding to visual queries using both a visual search engine and a vision language model (VLM). In particular, aspects of the present disclosure can improve the performance of a VLM at generating a response to a visual queries by supplementing the visual query with one or more annotations generated by or using the visual search engine.

20 Claims, 15 Drawing Sheets

ENHANCING VISION LANGUAGE MODEL UNDERSTANDING VIA VISUAL SEARCH SERVICE-DERIVED ANNOTATIONS

FIELD

The present disclosure relates generally to machine learning processes and machine-learned devices and systems. More particularly, the present disclosure relates to enhancing a vision language model's ability to understand and process vision-based queries (e.g., multi-modal queries) via the creation and use of visual search service-derived query annotations.

BACKGROUND

One significant technical problem within the field of computer vision and machine learning is the challenge of integrating and contextualizing diverse data types during the processing of multi-modal queries, such as queries that contain both text and one or more query images.

In particular, certain existing machine-learning-based query-processing systems simply directly process the multi-modal query with a vision language model (VLM) to directly produce and return a model output. However, in this approach, the quality, accuracy, and groundedness of the model output is entirely based on the capabilities of the VLM in understanding the content depicted in the query image(s) and also the scope of information on which the VLM has been trained.

Processing a multi-modal query directly with a VLM can lead to model-generated responses that lack relevance, accuracy, or groundedness. Specifically, the model may not fully understand the context or content of the visual data it processes and/or may not have been trained on training data which provides sufficient information to provide an appropriate response to the query.

SUMMARY

Aspects and advantages of embodiments of the present disclosure will be set forth in part in the following description, or can be learned from the description, or can be learned through practice of the embodiments.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a computer-implemented method for responding to visual queries. The computer-implemented method includes receiving, by a computing system may include one or more computing devices, a query may include one or more query images. The method also includes processing, by the computing system, the one or more query images with a visual search engine to identify, by the visual search engine, one or more context items based on the one or more query images. The method also includes generating, by the computing system, one or more annotations based on the one or more context items. The method also includes annotating, by the computing system, the query with the one or more annotations to generate an annotated query. The method also includes processing, by the computing system, the annotated query with a machine-learned vision language model to generate, as an output of the machine-learned vision language model, a response to the annotated query. Other embodiments of this aspect include corresponding computer systems, apparatus, and computer programs recorded on one or more computer storage devices, each configured to perform the actions of the methods.

Implementations may include one or more of the following features. The computer-implemented method where the visual search engine is a web-integrated visual search engine, and where the one or more context items may include one or more web documents that are returned, by the web-integrated visual search engine, as results related to the one or more query images. Generating the one or more annotations may include extracting the one or more annotations from the one or more web documents. Annotating the query with the one or more annotations may include overlaying the one or more annotations upon at least one of the one or more query images. The one or more context items may include bounding shapes for one or more objects depicted in the one or more query images. Annotating the query with the one or more annotations may include overlaying the one or more bounding shapes upon at least one of the one or more query images. Annotating the query further may include: adding reference numbers to the one or more bounding shapes and modifying the query to contain textual references for the reference numbers. Annotating the query with the one or more annotations may include modifying the query to contain textual references to coordinate positions of one or more objects depicted in the one or more query images. The textual references to coordinate positions may include textual references to bounding shape locations of the one or more objects depicted in the one or more query images. The one or more context items may include object labels for one or more objects depicted in the one or more query images. The query may include a multi-modal query. The query may include the one or more query images and textual content. Annotating the query may include modifying the textual content based on the one or more context items. Modifying the textual content based on the one or more context items may include replacing ungrounded references within the textual content with object labels derived from the one or more query images. The machine-learned vision language model may include a sequence processing model. The machine-learned vision language model has been trained or re-trained on training data containing annotated queries. The one or more query images may include a query video. Implementations of the described techniques may include hardware, a method or process, or computer software on a computer-accessible medium.

One general aspect includes a computing system for training a vision language model to process annotated queries. The computing system also includes one or more processors. The system also includes one or more non-transitory computer-readable media that collectively store computer-executable instructions for performing operations. The operations may include obtaining a training input may include one or more images. The operations may include processing the one or more images with a visual search engine to identify, by the visual search engine, one or more context items based on the one or more images. The operations may include generating one or more annotations based on the one or more context items. The operations may include annotating the training input with the one or more annotations to generate an annotated training input. The operations may include processing the annotated training input with a vision language model to generate, as an output of the vision language model, a response to the annotated training input. The operations may include modifying one or more values of one or more parameters of the vision language model based on a loss function that evaluates the response generated by the vision language model. Other embodiments of this aspect include corresponding computer systems, apparatus, and computer programs recorded on one or more computer storage devices, each configured to perform the actions of the methods.

Implementations may include one or more of the following features. The computer system where the visual search engine is a web-integrated visual search engine, and where the one or more context items may include one or more web documents that are returned, by the web-integrated visual search engine, as results related to the one or more query images. Generating the one or more annotations may include extracting the one or more annotations from the one or more web documents. Annotating the training input with the one or more annotations may include overlaying the one or more annotations upon at least one of the one or more images. The one or more context items may include bounding shapes for one or more objects depicted in the one or more images. Implementations of the described techniques may include hardware, a method or process, or computer software on a computer-accessible medium.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

DETAILED DESCRIPTION

Figure 1:
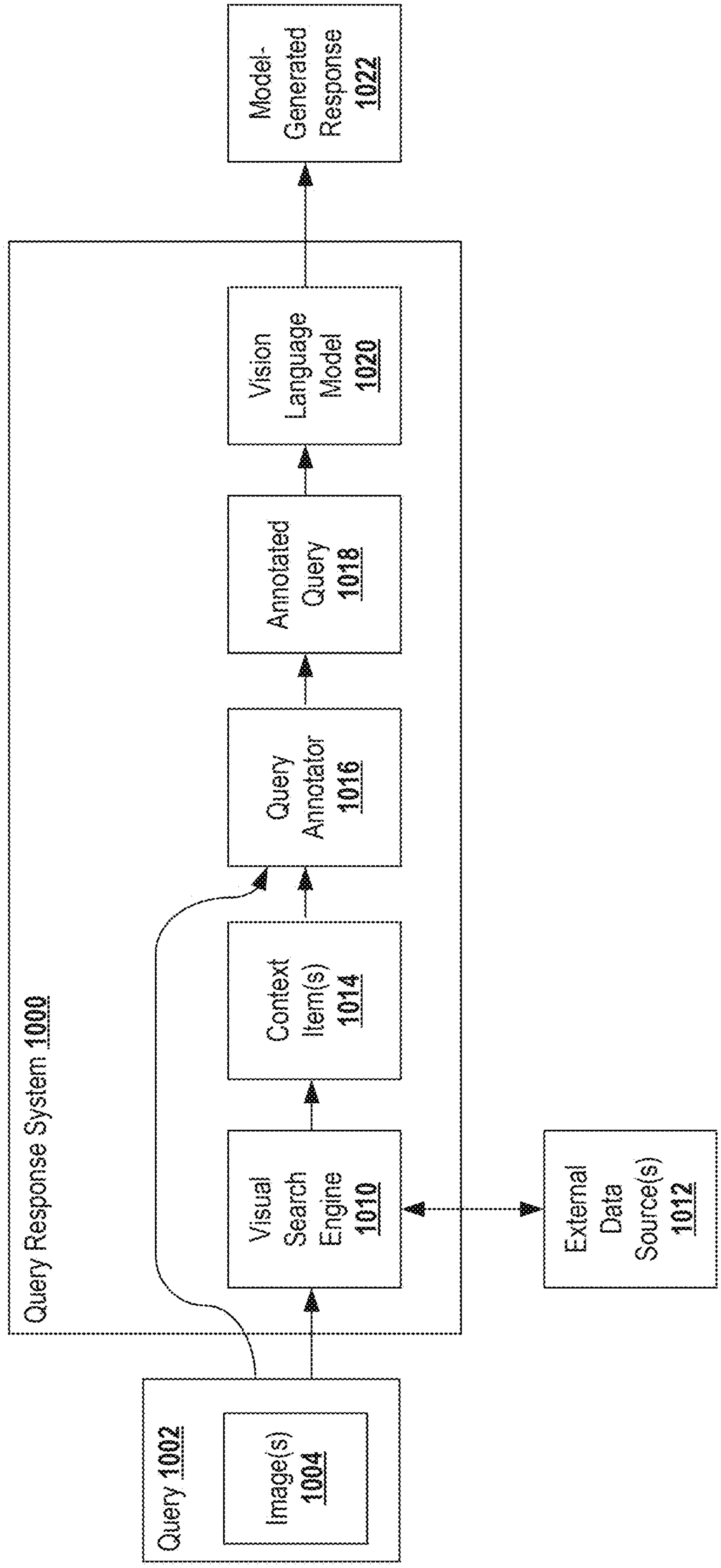
FIG. 1 depicts a schematic diagram of an example query response system according to example implementations of aspects of the present disclosure.

Example aspects of the present disclosure are directed to computer-implemented systems and methods for responding to visual queries using both a visual search engine and a vision language model (VLM). In particular, aspects of the present disclosure can improve the performance of a VLM at generating a response to a visual queries by supplementing the visual query with one or more annotations generated by or using the visual search engine.

According to one aspect, an incoming visual query (e.g., multi-modal query containing one or more query image(s)) can first be processed by the visual search engine. The visual search engine can identify one or more context items based on the visual query. For example, the context items can include external knowledge (e.g., web documents, similar images, knowledge graph entries, etc.) retrieved by the visual search engine from an external data source (e.g., the Internet, knowledge graphs, user-specific datastores, etc.). As another example, the context items can be generated by processing functionality contained within the visual search engine. For example, the additional contextual information can include positional information (e.g., bounding shapes) that describe the position of various objects and/or entities within the query image(s).

The query can then be annotated using the one or more context items. For example, information extracted from retrieved and/or generated context items can be added to the query (e.g., as additional textual elements, additional visual elements, etc.) In one example, bounding shapes or other visual annotations can be overlaid upon the query image(s). The VLM can then process the annotated query, which contains both the original query content and also the added annotation(s). The annotations, which contain additional contextual information returned by the visual search engine, can enable the VLM to provide a richer response that is more contextually-guided and/or contextually-grounded.

Another example aspect of the present disclosure relates to the use of the visual search engine to automatically create annotated training data. For example, an existing training input can be annotated using the visual search engine, as described above. The VLM can then be trained on the annotated training data (e.g., by scoring the ability of the VLM to infer a training output based on the annotated training input). In this manner, the VLM can be trained to understand and appropriately respond to annotated input data.

More particularly, an example method for responding to visual queries can include receiving a query that includes one or more query images. For instance, a user could submit a photograph of a landmark to a query response system along with query text that states: “How much do tickets cost?”

Upon receiving the query, the disclosed method processes the query images through a visual search engine. This visual search engine can be capable of generating or retrieving context items that enhance the understanding of the images, such as by recognizing and delineating objects within the scene. These context items can include object recognitions, bounding boxes that highlight specific areas of the image, or even content like web pages or additional images sourced from the Internet. The type of visual search engine employed can vary; in some implementations, it may be a web-integrated visual search engine that specifically pulls this relevant additional data from the internet to provide a richer context to the visual data being analyzed.

As used herein, the term “visual search engine” generally refers a specialized software system designed to analyze visual content from images or videos and retrieve or generate related information (e.g., from an external source of knowledge, which may include the Internet) and/or by using internal processing tools such as objection recognition models, instance segmentation models, etc. In some cases, unlike generic object detection technology, which primarily identifies and categorizes objects within an image based on pre-trained models, a visual search engine not only recognizes these objects but also understands the context around them by fetching additional related data from external sources.

To provide an example, upon recognizing a landmark in a photograph, a visual search engine can access web documents to provide historical facts, visitor information, and/or even current information related to that landmark (e.g., real-time weather, traffic, and/or crowdedness information). This capability to link recognized objects with extensive and varied external knowledge (e.g., web-based resources) such as images, websites, and/or other extracted information enables a more comprehensive and enriched data retrieval process.

External sources of data accessed by a visual search engine can include news databases, social media platforms, and real-time traffic and weather feeds, among others. These sources often contain the most current information available, reflecting up-to-date world knowledge that can significantly enhance the relevance and accuracy of the data provided by the search engine. For instance, linking to real-time traffic data can inform users about current road conditions near recognized landmarks, while integrating social media feeds can offer insights into recent events or popular opinions related to the objects identified in the query images. Thus, as an example, in response to the query that depicts the landmark and asks how much tickets cost, the visual search engine can identify a context item (e.g., website) that provides up-to-date information about the cost of tickets to visit the landmark.

Thus, in some implementations, the visual search engine can enhance query processing by returning relevant web pages and using the information contained within these pages to generate annotations. The system then uses this information to generate annotations that are added to the query. These annotations can provide the user with enriched contextual details that go beyond mere visual recognition, such as the monument’s significance or upcoming cultural events at the location. By supplementing the query with this web-derived information, the system can deliver a more informative and enriched response, effectively utilizing the internet’s vast resources to augment the capabilities of the visual search engine.

In some implementations, the visual search engine employed in the disclosed technology can enhance query responses by also returning similar image results. This feature allows the system to identify images that are visually similar to the query image and provide additional context items such as the source website and the title of the image. For example, if a user queries an image of a historical landmark, the visual search engine can retrieve similar images, indicating where these images appear online along with descriptive titles that can offer historical insights or visitor information. This not only enriches the user’s query with broader visual and textual data but also aids in providing a more comprehensive understanding of the subject matter.

Additionally or alternatively, a visual search service can create bounding shape context items. The bounding shape context item(s) can identify the position(s) of recognized object(s) within a query image. These bounding shape context items can be overlaid directly onto the image as a bounding shape annotation, thereby enhancing visual context for the VLM. Alternatively or additionally, the bounding shape context items can be presented as additional textual annotation data that describes the spatial relationships and dimensions of the objects in a textual form. Furthermore, annotations generated from the bounding shape context items can include instance segmentation information, which differentiates individual objects of the same type within an image.

Thus, following the identification of context items, which may include newly recognized objects, bounding boxes, or web-sourced content such as web pages or additional images, the query response system can generate annotations based on these items. For instance, if a vehicle is recognized within an image, the annotation could specify details extracted from this context item, such as the make and model of the car. These annotations can enhance the query by adding specific, detailed insights about the objects, entities, or other elements identified in the query images, thereby providing a richer contextual description of the visual data.

In some implementations, the annotations are used to modify the original query, creating what can be termed as an “annotated query” “This can include directly overlaying text descriptions and/or other visual information on the image, for example such as adding bounding shapes around identified objects. For instance, annotations could overlay arrows on the image pointing to identified objects with text describing each one. Alternatively or additionally, additional textual information can be incorporated into the query. For example, a relevant snippet (of text or image(s) can be taken from a web document returned as a result by the visual search engine. The snippet can be added (e.g., appended or concatenated) to the original query.

Thus, bounding box-based annotations in images and videos can be handled as follows. A first example approach includes directly manipulating the image or video frames by adding visible bounding boxes with reference numbers linked to a text prompt that names the identified entities, such as "1) Shampoo" and "2) Google Pixel Watch 3." As further examples, in addition or alternatively to bounding boxes, some example implementations may use other forms of visual markup, such as shading, masking, highlighting, arrows, etc. Another example method refrains from altering the image itself; instead, it incorporates annotations directly into the text prompt, detailing each entity with its bounding box coordinates, for example, "1) (y_min, x_min, y_max, x_max) Shampoo" and "2) (y_min, x_min, y_max, x_max) Google Pixel Watch 3," (where the placeholders such as y_min represent specific numeric values). Alternatively or additionally, the numbers could be added directly to the image. In general, various types of annotations can be performed to add information directly to the image(s) or to add information to other data structures (e.g., prompts, metadata, etc.) that are associated with the image(s). In some implementations, bounding boxes can also be generated for other images that are similar to those in the query, providing visual markers that delineate specific objects or areas of interest within these comparable images, and these comparable images can be included in the annotated query.

The annotated query is then processed by a vision language model to generate a response. This model can use the enriched information from the annotations to provide a more accurate and contextually relevant response to the user. For example, in response to the query about the cost of tickets for the landmark, the model can generate a response that contains accurate, up-to-date information about the cost of tickets to visit the landmark. In another example in which the query contains a query image that depicts a person wearing a watch and the annotation identifies the watch as the Google Pixel Watch 3, the model-generated response can contain more precise, relevant information about the Google Pixel Watch 3, such as review information, hardware specifications, current purchasing opportunities, etc.

In this way, the model-generated-responses can include richer, more contextually-relevant response information; for example as compared to a response generated based on the image alone. For example, a model-generated response to the example queries described above may either include hallucinated information, out-of-date information, and/or information that fails to relate to the specific entity shown in the image. For example, a model-generated response based on the image alone may provide only generic information about watches, rather than information that is specific to the Google Pixel Watch 3.

Thus, the disclosed technology excels in processing queries that require the recognition of specific entities where generic object detection can fall short. For example, when a query includes identifying a particular brand of car or a specific type of tree within an image, the visual search engine can utilize advanced recognition algorithms and access to a broader database, possibly including web-integrated sources, to accurately identify and annotate these particular entities. These annotations can provide detailed information about the entities, such as the model of the car or the botanical details of the tree, which generic object detection systems cannot discern. By enabling precise entity recognition, the system can effectively respond to specialized queries, offering a significant performance boost in scenarios where detailed, entity-specific information is beneficial.

Furthermore, the disclosed technology can significantly enhance performance in tasks that include counting objects within an image or video. For example, when a query includes determining the number of specific objects, such as cars in a parking lot or attendees in a conference room, the system utilizes the visual search engine to accurately identify and annotate each object with bounding boxes. These annotations facilitate precise object recognition and counting, even in complex scenes where objects may overlap or be partially obscured. By leveraging a visual search engine to perform the detection and counting process with high accuracy, the system can provide more reliable model-generated responses.

As another example, the disclosed technology can also significantly enhance performance in handling queries that include positional or relative positional information. For instance, when a query requires identifying the position of objects relative to one another, such as asking which car is closest to the entrance of a parking lot or determining the arrangement of furniture in a room, the system leverages the visual search engine to detect and annotate these objects with bounding boxes. These annotations not only pinpoint the location of each object but also enable the system to understand and respond to queries about their relative positions. By providing detailed spatial data and contextual relationships between objects, the system can accurately address complex positional queries.

The proposed systems and methods can also include specific enhancements for video queries. For example, when the query contains a video, the query response system can process each frame of the video similarly to how it processes static images, applying dynamic annotations that change as the video progresses.

Another example aspect of the present disclosure is directed to training the VLM to comprehend positional entity annotations. Generally, VLMs may not inherently possess robust capabilities for understanding distinct entities, particularly in terms of their spatial relationships, unless they are explicitly trained with data that includes positional annotations. To enhance this capability, the model can be trained using a newly-created dataset that includes images and videos annotated with positional information about various entities. For example, an existing training dataset and/or a newly-created training dataset can be annotated using a visual search engine as described herein. Specifically, the visual search engine can create positional annotations such as bounding shapes.

By incorporating positional data in the training process, the VLM can develop a better understanding of positional entities, which in turn can improve the quality of the model's responses. This training approach ensures that the VLM can effectively interpret and respond to queries that include spatial context or the relative positioning of objects within visual data.

The systems and methods of the present disclosure provide a number of technical effects and benefits. As one example, the disclosed technology significantly enhances the processing of visual data through the application of a visual search engine to create query annotations. By employing a visual search engine that can accurately identify and contextualize objects within images and/or videos, the technology enables more precise interpretations of visual data. As another example, the technology supports the efficient training and adaptation of VLMs using automatically generated annotations. This feature allows the models to improve their performance over time, adapting to new data with greater accuracy.

Various example implementations are described herein with respect to the accompanying Figures.

FIG. 1 illustrates a schematic representation of an example query response system 1000. The query response system 1000 can be designed to process visual queries by employing various components that interact to generate a model-generated response 1022. The system 1000 includes a visual search engine 1010, a query annotator 1016, and a VLM 1020. Each component of the query response system 1000 can be implemented using hardware, software, or a combination of both.

The process begins with a query 1002, which can be submitted by a user or another system. The query 1002 can include one or more images 1004, which are visual representations that can be photographs, diagrams, and/or any other form of image data, including videos. The images 1004 serve as the primary input data for the visual search engine 1010.

Specifically, the visual search engine 1010 processes the image(s) 1004 to extract relevant information. This engine 1010 can be a software module equipped with algorithms capable of image recognition and data retrieval. The visual search engine 1010 can also interact with external data sources 1012, which can include databases, web servers, or any other repositories containing additional data that can enhance the search results.

In particular, in contrast with generic object detection models or services, the visual search engine 1010 not only recognizes objects (e.g., entities) within the images 1004 but also understands the context surrounding these objects. While typical object detection systems are adept at identifying and categorizing objects based on pre-trained models, the visual search engine 1010 extends this functionality by integrating contextual data from external data sources 1012. This integration allows the visual search engine 1010 to access a broader range of information, such as historical data, related images, and/or relevant textual content. This access to external data sources 1012 improves the ability of the visual search engine 1010 to provide precise and contextually relevant information. For example, upon recognizing a specific landmark in an image, the visual search engine 1010 can retrieve and incorporate data about the landmark's history, visitor statistics, and/or upcoming events from connected databases or web resources. The visual search engine 1010 can therefore offer a richer, more informative output than standard object detection models.

Context items 1014 are generated based on the analysis performed by the visual search engine 1010. These context items 1014 can include metadata, tags, and/or any descriptive elements that provide more information about the content depicted in the images 1004. For example, context items 1014 could be labels identifying objects within the images 1004 or links to external documents related to the imagery.

Thus, context items 1014 can encompass a wide array of data types and sources that enhance the contextual understanding of the images 1004. These can include geographic coordinates if the images 1004 depict locations, which can be useful for mapping applications. Context items 1014 can also include timestamps that indicate when the images 1004 were taken, providing temporal context that can be useful for time-sensitive or time-varying information. Furthermore, context items 1014 can include links to recent news articles, social media posts, or user-generated content that are relevant to the subjects depicted in the images 1004. For instance, if the visual search engine 1010 identifies a landmark or event in the images 1004, context items 1014 can include web results with the latest visitor reviews, upcoming event schedules, or maintenance updates for the landmark. These web results can be dynamically fetched to ensure the information is current, thereby providing a richer and more accurate dataset for generating the annotated query 1018.

The query annotator 1016 uses the context items 1014 to annotate the initial query 1002, resulting in an annotated query 1018. The query annotator 1016 can modify the original query 1002 by adding textual descriptions, hyperlinks, and/or other informative elements derived from the context items 1014. This process enriches the original query 1002 with additional data, making it more comprehensive.

In particular, the annotations performed by the query annotator 1016 on the original query 1002 can vary in form and substance based on the requirements of the query and the nature of the context items 1014. These annotations can include modifications directly on the query image(s) 1004, such as overlaying textual labels, arrows, or bounding shapes that highlight specific features or objects identified by the visual search engine 1010. Additionally, the query annotator 1016 can append or integrate additional textual content to the query 1002, which can include explanatory notes, references, or supplementary details that enhance understanding. In some cases, the query annotator 1016 can also modify any existing query text to incorporate or replace terms based on the insights drawn from the context items 1014. Other formats of annotations can include adding interactive elements or links that allow users to engage with the annotated query 1018 in a dynamic manner.

In some implementations, the query annotator 1016 can include or can leverage a machine-learned model, such as a VLM, to enhance its annotation capabilities. For example, a VLM can process both the query 1002 and the returned context items 1014 to determine which portions of the context items 1014 are most relevant to the query 1002. This determination (e.g., which may be guided by a system prompt or set of instructions) can include analyzing the semantic and contextual relationships between the content of the query 1002 and the information contained within the context items 1014. Based on this analysis, the VLM can select specific data from the context items 1014 that should be included as annotations in the annotated query 1018. This capability allows the query annotator 1016 to create more precise and relevant annotations by focusing on aspects of the context items 1014 that directly enhance the understanding or resolution of the query 1002.

The annotated query 1018 is then processed by the VLM 1020, which can be a machine learning model trained to interpret and generate responses (e.g., textual responses) based on visual and textual inputs. The VLM 1020 analyzes the annotated query 1018 and produces a model-generated response 1022. This response can be a text that answers questions posed in the query 1002, provides descriptions, or offers other relevant information based on the analysis.

The VLM 1020 can be an example of a large multimodal model, such as those found in Google's Gemini family of models. These models are capable of processing both visual and textual inputs simultaneously, allowing for a more integrated approach to understanding and responding to the annotated query 1018. By leveraging the capabilities of such advanced models, the VLM 1020 can enhance its accuracy and relevance in generating responses. These models are typically trained on diverse datasets that include a wide range of images and text, enabling them to handle a variety of query types and complexities.

In some instances, the VLM 1020 can be trained or may have been trained using annotated queries, such as the annotated query 1018. This training approach includes using queries that have already been enriched with context items 1014 and additional annotations from the query annotator 1016. By training the VLM 1020 on such enriched queries, the model can learn to recognize and utilize the added contextual information effectively. This training method can improve the model's ability to discern nuances in the queries, leading to more accurate and contextually relevant responses. The use of annotated queries for training can thus help in fine-tuning the model's performance, especially in complex scenarios where contextual understanding is advantageous.

In some implementations, the query annotator 1016 and/or the VLM 1020 may (with the user's consent) have access to a memory layer that contains user-specific information and/or other context stored from prior interactions with the user. This memory layer can include a database or a cache that retains data specific to individual users or general contextual information that has been accumulated over time through various user interactions. For example, the memory layer can store preferences, historical queries, or previous responses that are relevant to the current processing task. Access to this memory layer allows the query annotator 1016 and the VLM 1020 to tailor their processing and responses more accurately and personally, leveraging past interactions to enhance the relevance and precision of the output generated by the system. This capability can be particularly useful in applications where continuous learning and adaptation to user-specific needs are critical.

Following the generation of the model-generated response 1022 by the VLM 1020, this response can be conveyed to a user or relayed to another system for further action. The transmission of the model-generated response 1022 can occur via user interfaces, such as web pages, mobile applications, or other digital communication platforms, enabling the user to receive timely and relevant information directly. Additionally, the system can be configured to perform certain actions automatically based on the contents of the model-generated response 1022 (with the user's prior consent). For example, if the model-generated response 1022 includes information about ticket availability for an event, the system could automatically initiate a ticket purchase process, schedule reminders, or perform other related tasks that enhance user convenience and engagement. These actions can be tailored based on user preferences and settings to ensure that all automatic procedures align with the user's expectations and authorization.

Figure 2:
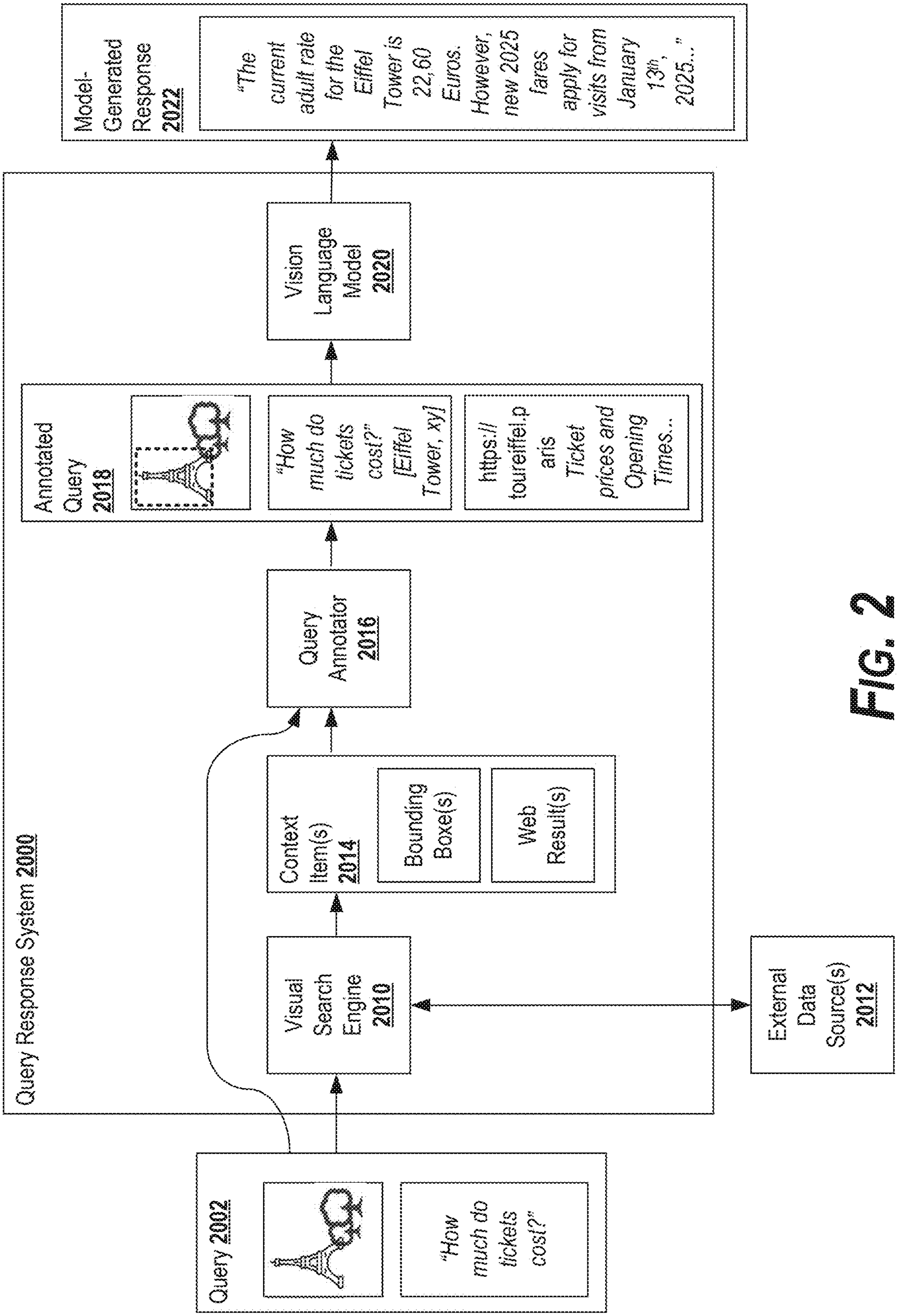
FIG. 2 depicts a schematic diagram of an example query response system processing an example multi-modal query according to example implementations of aspects of the present disclosure.

FIG. 2 provides a detailed example of an example query response system 2000 in operation, specifically illustrating how a query 2002 concerning ticket prices for a landmark is processed. This figure builds upon the general components described in FIG. 1, focusing on a specific example for the purpose of illustrating operation of the example system.

The query 2002 in this example includes both textual content asking: "How much do tickets cost?" and an image of a landmark, specifically depicted as the Eiffel Tower. This combination of text and visual data typifies a multi-modal input that the query response system 2000 can handle.

The visual search engine 2010 processes the image component of the query 2002. In this example, the visual search engine 2010 can utilize algorithms for landmark recognition and contextual data retrieval. The external data sources 2012 in this scenario can include databases or online resources that contain information about landmarks and their associated visitor information, such as ticket prices, historical significance, or visitor statistics.

Context items 2014 generated from the processing by the visual search engine 2010 can include bounding boxes that delineate the landmark within the image and web results that provide real-time or updated information about ticket prices. For instance, context items 2014 could link to a website with current pricing information for the Eiffel Tower.

The query annotator 2016 uses these context items 2014 to create an annotated query 2018. In this example, the annotated query 2018 includes the original query text augmented with specific details extracted from the web results, such as the URL of a relevant ticketing page and a textual snippet indicating current ticket prices and special conditions or upcoming changes in pricing.

The vision language model 2020 processes the annotated query 2018 and generates a model-generated response 2022. In some implementations, potentially in addition to the annotated query 2018, the visual language model 2020 may also be provided with the original query 2002 (e.g., the original image contained in the query 2002). Providing both the original image and the annotated image can be beneficial in cases where there are a significant number of visual annotations (e.g., bounding boxes) which may obscure portion(s) of the original image.

The model-generated response 2022 can articulate detailed and context-specific information, such as stating "The current adult rate for the Eiffel Tower is 22,60 Euros. However, new 2025 fares apply for visits from Jan. 13, 2025." This example demonstrates how the system can provide precise and timely information tailored to the user's inquiry.

Figure 3:
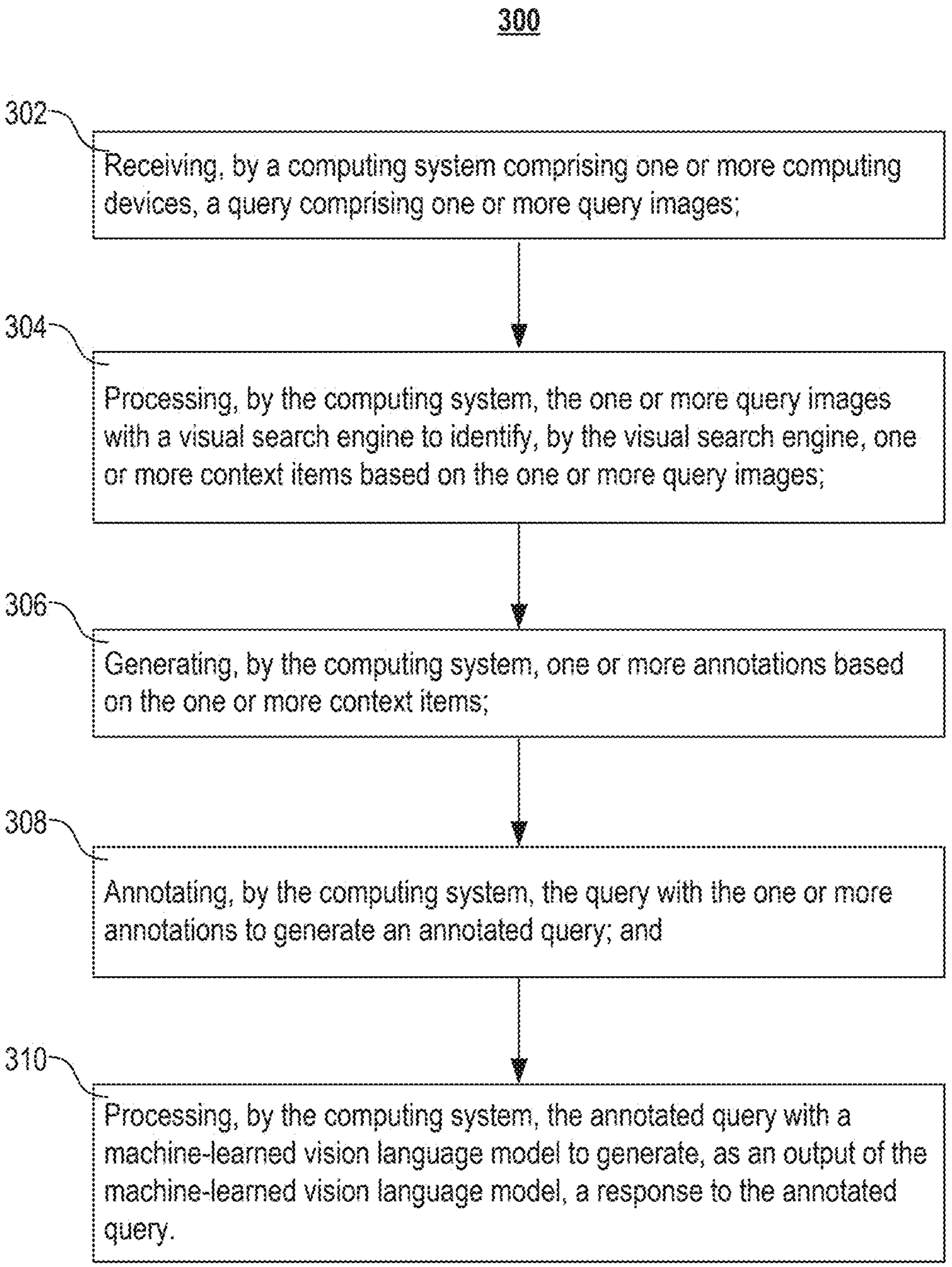
FIG. 3 is a flow chart diagram illustrating an example method for generating a response to a query according to example implementations of aspects of the present disclosure.

FIG. 3 depicts a flow chart of a computer-implemented method 300 for responding to visual queries. The method 300 comprises a series of steps executed by a computing system, which can include one or more computing devices equipped with necessary hardware and software components to perform the described operations.

Step 302 includes receiving, by the computing system, a query that comprises one or more query images. These query images can be digital photographs, graphics, or any visual representations that form the basis for the query.

At step 304, the computing system processes the one or more query images with a visual search engine. The visual search engine can be a web-integrated visual search engine or any other type configured to analyze visual content. At step 304, the visual search engine can identify one or more context items based on the one or more query images. These context items can include, but are not limited to, web documents, object labels, or bounding shapes for objects depicted in the images.

Step 306 includes generating, by the computing system, one or more annotations based on the one or more context items identified in the previous step. The generation of these annotations can include extracting information from web documents or creating descriptive metadata that relates to the content identified in the query images.

At step 308, the computing system annotates the query with the one or more annotations to generate an annotated query. This step can include overlaying the annotations upon at least one of the query images, modifying the query to contain textual references to coordinate positions of objects depicted in the images, or adding reference numbers to bounding shapes and modifying the query to include textual references for these numbers.

Finally, at step 310, the computing system processes the annotated query with a machine-learned vision language model to generate a response to the annotated query. The vision language model can be a sequence processing model and may have been trained or re-trained on training data containing annotated queries. The output of the vision language model is a response that addresses the content and context of the annotated query, providing relevant information or answers based on the annotations and the original query content.

Figure 4:
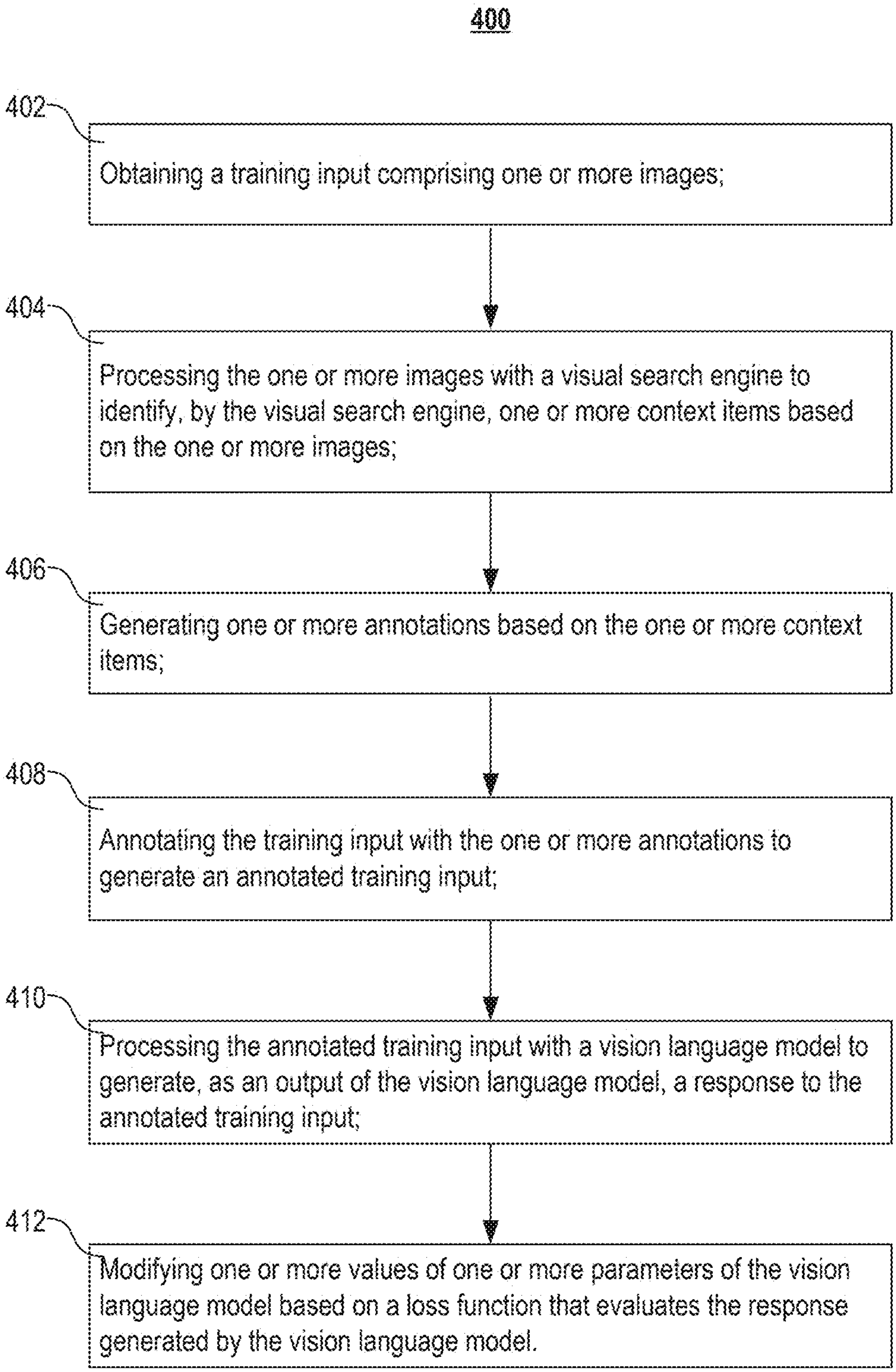
FIG. 4 is a flow chart diagram illustrating an example method for training a vision language model according to example implementations of aspects of the present disclosure.

FIG. 4 illustrates a flow chart of a computer-implemented method 400 for training a vision language model to process annotated queries. This method 400 is designed to enhance the capability of a vision language model by training it with inputs that are annotated based on context derived from visual search engines.

Step 402 includes obtaining a training input that comprises one or more images. These images can be any form of visual content, such as digital photographs, graphics, or scanned documents, which are used as the basis for generating training data.

At step 404, the computing system processes the one or more images with a visual search engine. The visual search engine employed here can be a web-integrated visual search engine, which is capable of accessing and retrieving data from external web sources. This step aims to identify, by the visual search engine, one or more context items based on the one or more images. The one or more context items can include, for example, one or more web documents that are returned by the web-integrated visual search engine as results related to the one or more query images.

Step 406 includes generating one or more annotations based on the one or more context items. This generation process can include extracting the one or more annotations from the one or more web documents retrieved in the previous step. Additionally or alternatively, the context items could include bounding shapes for one or more objects depicted in the one or more images, which can also be used to generate annotations.

At step 408, the computing system annotates the training input with the one or more annotations to generate an annotated training input. This step can include overlaying the one or more annotations upon at least one of the one or more images, incorporating the extracted data or bounding shapes directly onto the visual content of the training input.

Step 410 includes processing the annotated training input with a vision language model. The vision language model analyzes the annotated training input and generates a response based on the annotations and the content of the images. This response is an output of the vision language model and serves as a simulated answer or data output that the model would provide if used in a real-world scenario.

Finally, at step 412, the method includes modifying one or more values of one or more parameters of the vision language model based on a loss function. This loss function evaluates the response generated by the vision language model to determine its accuracy and relevance. The adjustments made to the parameters are aimed at optimizing the model's performance for future queries, enhancing its ability to accurately process and respond to annotated inputs.

Figure 5:
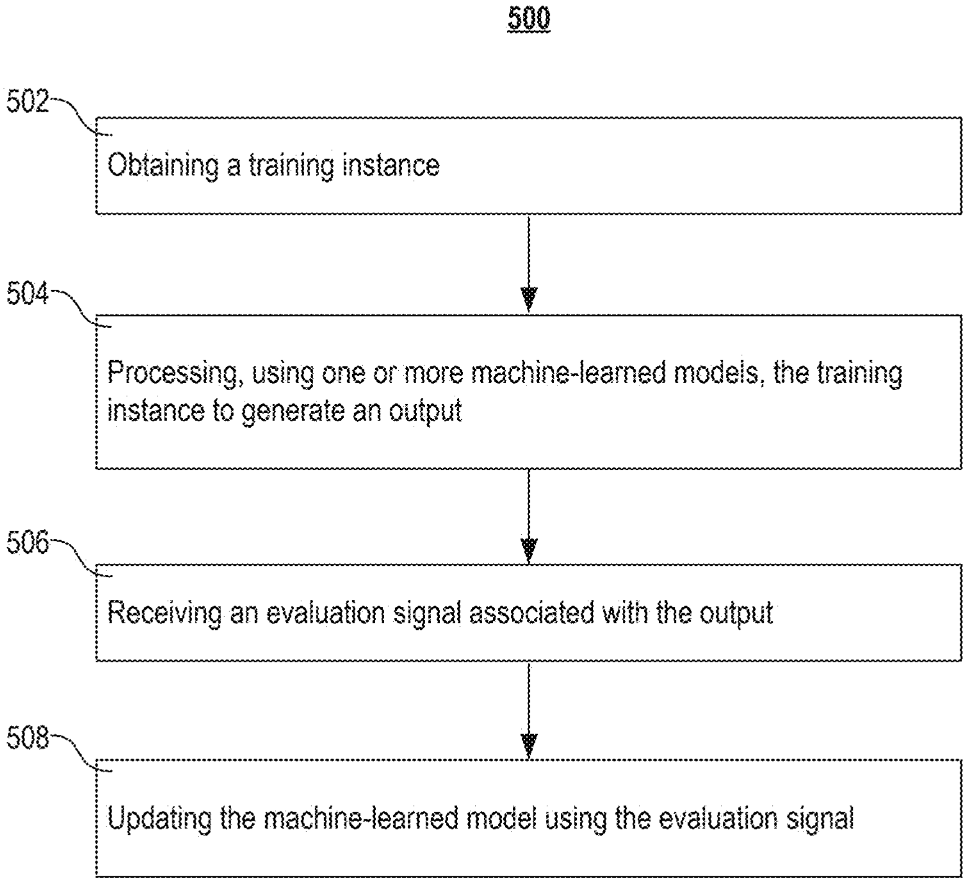
FIG. 5 is a flow chart diagram illustrating an example method for training a machine-learned model according to example implementations of aspects of the present disclosure.

FIG. 5 depicts a flowchart of a method 500 for training one or more machine-learned models according to aspects of the present disclosure. For instance, an example machine-learned model can include a vision language model. For instance, an example machine-learned model can include a sequence processing model. For instance, a vision language model can include a sequence processing model.

One or more portion(s) of example method 500 can be implemented by a computing system that includes one or more computing devices such as, for example, computing systems described with reference to the other figures. Each respective portion of example method 500 can be performed by any (or any combination) of one or more computing devices. Moreover, one or more portion(s) of example method 500 can be implemented on the hardware components of the device(s) described herein, for example, to train one or more systems or models. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 5 is described with reference to elements/terms described with respect to other systems and figures for exemplary illustrated purposes and is not meant to be limiting. One or more portions of example method 500 can be performed additionally, or alternatively, by other systems.

At 502, example method 500 can include obtaining a training instance. A set of training data can include a plurality of training instances divided between multiple datasets (e.g., a training dataset, a validation dataset, or testing dataset). A training instance can be labeled or unlabeled. Although referred to in example method 500 as a "training" instance, it is to be understood that runtime inferences can form training instances when a model is trained using an evaluation of the model's performance on that runtime instance (e.g., online training/learning). Example data types for the training instance and various tasks associated therewith are described throughout the present disclosure.

At 504, example method 500 can include processing, using one or more machine-learned models, the training instance to generate an output. The output can be directly obtained from the one or more machine-learned models or can be a downstream result of a chain of processing operations that includes an output of the one or more machine-learned models.

At 506, example method 500 can include receiving an evaluation signal associated with the output. The evaluation signal can be obtained using a loss function. Various determinations of loss can be used, such as mean squared error, likelihood loss, cross entropy loss, hinge loss, contrastive loss, or various other loss functions. The evaluation signal can be computed using known ground-truth labels (e.g., supervised learning), predicted or estimated labels (e.g., semi- or self-supervised learning), or without labels (e.g., unsupervised learning).

The evaluation signal can be a reward (e.g., for reinforcement learning). The reward can be computed using a machine-learned reward model configured to generate rewards based on output(s) received. The reward can be computed using feedback data describing human feedback on the output(s).

At 508, example method 500 can include updating the machine-learned model using the evaluation signal. For example, values for parameters of the machine-learned model(s) can be learned, in some embodiments, using various training or learning techniques, such as, for example, backwards propagation. For example, the evaluation signal can be backpropagated from the output (or another source of the evaluation signal) through the machine-learned model(s) to update one or more parameters of the model(s) (e.g., based on a gradient of the evaluation signal with respect to the parameter value(s)). For example, system(s) containing one or more machine-learned models can be trained in an end-to-end manner. Gradient descent techniques can be used to iteratively update the parameters over a number of training iterations. In some implementations, performing backwards propagation of errors can include performing truncated backpropagation through time. Example method 500 can include implementing a number of generalization techniques (e.g., weight decays, dropouts, etc.) to improve the generalization capability of the models being trained.

In some implementations, example method 500 can be implemented for training a machine-learned model from an initialized state to a fully trained state (e.g., when the model exhibits a desired performance profile, such as based on accuracy, precision, recall, etc.).

In some implementations, example method 500 can be implemented for particular stages of a training procedure. For instance, in some implementations, example method 500 can be implemented for pre-training a machine-learned model. Pre-training can include, for instance, large-scale training over potentially noisy data to achieve a broad base of performance levels across a variety of tasks/data types.

In some implementations, example method 500 can be implemented for fine-tuning a machine-learned model. Fine-tuning can include, for instance, smaller-scale training on higher-quality (e.g., labeled, curated, etc.) data. Fine-tuning can affect all or a portion of the parameters of a machine-learned model. For example, various portions of the machine-learned model can be "frozen" for certain training stages. For example, parameters associated with an embedding space can be "frozen" during fine-tuning (e.g., to retain information learned from a broader domain(s) than present in the fine-tuning dataset(s)). In some implementations, example method 500 uses adapter modules. Adapters can be small trainable layers that are inserted between pre-existing layers of a pre-trained model. During the fine-tuning process, the original parameters of the pre-trained model are typically frozen, and only the parameters of the adapters are updated.

In some implementations, example method 500 can be implemented to execute parameter-efficient fine-tuning methods, such as Layerwise Optimization of Residuals (LoRA). LoRA can refine pre-trained models with minimal adjustments to the original parameters. This can be achieved by introducing trainable low-rank matrices that modify the behavior of the pre-trained weights without directly altering them. In some implementations, during fine-tuning, only these auxiliary matrices are updated, which significantly reduces the number of parameters that are trained.

An example fine-tuning approach includes reinforcement learning. Reinforcement learning can be based on user feedback on model performance during use.

Figure 6:
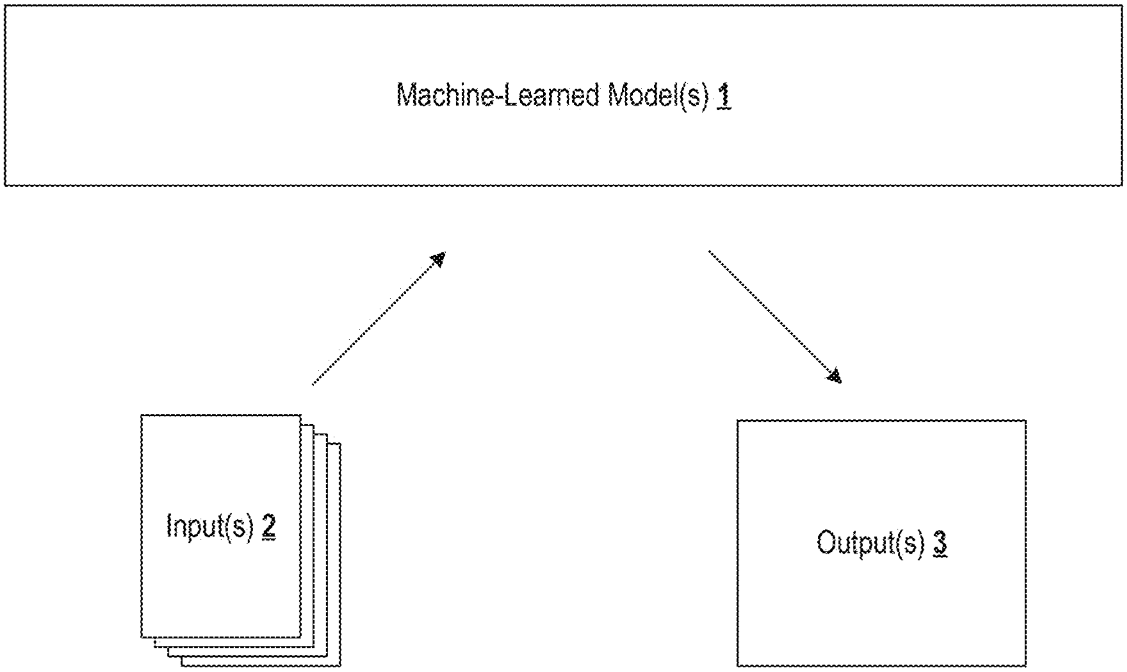
FIG. 6 is a block diagram of an example processing flow for using machine-learned model(s) to process input(s) to generate output(s) according to example implementations of aspects of the present disclosure.

FIG. 6 is a block diagram of an example processing flow for using machine-learned model(s) 1 to process input(s) 2 to generate output(s) 3.

Machine-learned model(s) 1 can be or include one or multiple machine-learned models or model components. Example machine-learned models can include neural networks (e.g., deep neural networks). Example machine-learned models can include non-linear models or linear models. Example machine-learned models can use other architectures in lieu of or in addition to neural networks. Example machine-learned models can include decision tree based models, support vector machines, hidden Markov models, Bayesian networks, linear regression models, k-means clustering models, etc.

Machine-learned model(s) 1 can be or include, or otherwise be representative of any one or more of the machine-learned models described above with respect to the preceding figures. For example, machine-learned model(s) 1 can be or include, or otherwise be representative of any one or more of any of the models described herein, etc. Although various features, variations, and implementations described below are described with respect to machine-learned model(s) 1, it is to be understood that such features, variations, and implementations are to be understood as described with respect to each of the models described herein, etc., any other machine-learned component described herein.

Example neural networks can include feed-forward neural networks, recurrent neural networks (RNNs), including long short-term memory (LSTM) based recurrent neural networks, convolutional neural networks (CNNs), diffusion models, generative-adversarial networks, or other forms of neural networks. Example neural networks can be deep neural networks. Some example machine-learned models can leverage an attention mechanism such as self-attention. For example, some example machine-learned models can include multi-headed self-attention models.

Machine-learned model(s) 1 can include a single or multiple instances of the same model configured to operate on data from input(s) 2. Machine-learned model(s) 1 can include multiple different models or multiple different model portions configured to operate on data from input(s) 2.

Machine-learned model(s) 1 can include an ensemble of different models that can cooperatively interact to process data from input(s) 2. For example, a model ensemble can include multiple models that have different attributes (e.g., different architectures, trained with different recipes, etc.). The ensemble can output an overall output based on the individual outputs of the constituent models. In this manner, for instance, the diverse constituent models can work together to provide system-level robustness by effectively aggregating over individual strengths and weaknesses of any given model. The respective individual outputs can be combined in a weighted combination, using a voting or routing mechanism, or a learned output layer (e.g., one or more feedforward or fully-connected layers).

Machine-learned model(s) 1 can employ a mixture-of-experts structure. See, e.g., Zhou et al., *Mixture-of-Experts with Expert Choice Routing,* ARXIV:2202.09368v2 (Oct. 14, 2022). For example, different portions of a model can learn (explicitly or implicitly) different expertise areas, with pathways through the model being selected by a learned routing mechanism that engages the appropriate expert for a given input (e.g., a given portion of an input, such as on a per-token basis). For example, a feedforward network can be sparsely activated for a given portion of an input based on an output of a routing mechanism that processes the portion of the input. In this manner, for instance, the group of activated weights can form an "expert" that is selected by the router. On each forward pass, only a subset of the total model weights may be engaged, thereby decreasing a quantity of operations performed for processing a given input compared to a densely activated model. In this manner, for instance, the expressive and interpretive power of a high-parameter-count model can be achieved with more compute-efficient forward passes.

Input(s) 2 can generally include or otherwise represent various types of data. Input(s) 2 can include one type or many different types of data. Output(s) 3 can be data of the same type(s) or of different types of data as compared to input(s) 2. Output(s) 3 can include one type or many different types of data.

Example data types for input(s) 2 or output(s) 3 include natural language text data, software code data (e.g., source code, object code, machine code, or any other form of computer-readable instructions or programming languages), machine code data (e.g., binary code, assembly code, or other forms of machine-readable instructions that can be executed directly by a computer's central processing unit), assembly code data (e.g., low-level programming languages that use symbolic representations of machine code instructions to program a processing unit), genetic data or other chemical or biochemical data, image data, audio data, audio-visual data, haptic data, biometric data, medical data, financial data, statistical data, geographical data, astronomical data, historical data, sensor data generally (e.g., digital or analog values, such as voltage or other absolute or relative level measurement values from a real or artificial input, such as from an audio sensor, light sensor, displacement sensor, etc.), and the like. Data can be raw or processed and can be in any format or schema.

In multimodal inputs 2 or outputs 3, example combinations of data types include image data and audio data, image data and natural language data, natural language data and software code data, image data and biometric data, sensor data and medical data, etc. It is to be understood that any combination of data types in an input 2 or an output 3 can be present.

An example input 2 can include one or multiple data types, such as the example data types noted above. An example output 3 can include one or multiple data types, such as the example data types noted above. The data type(s) of input 2 can be the same as or different from the data type(s) of output 3. It is to be understood that the example data types noted above are provided for illustrative purposes only. Data types contemplated within the scope of the present disclosure are not limited to those examples noted above.

Figure 7:
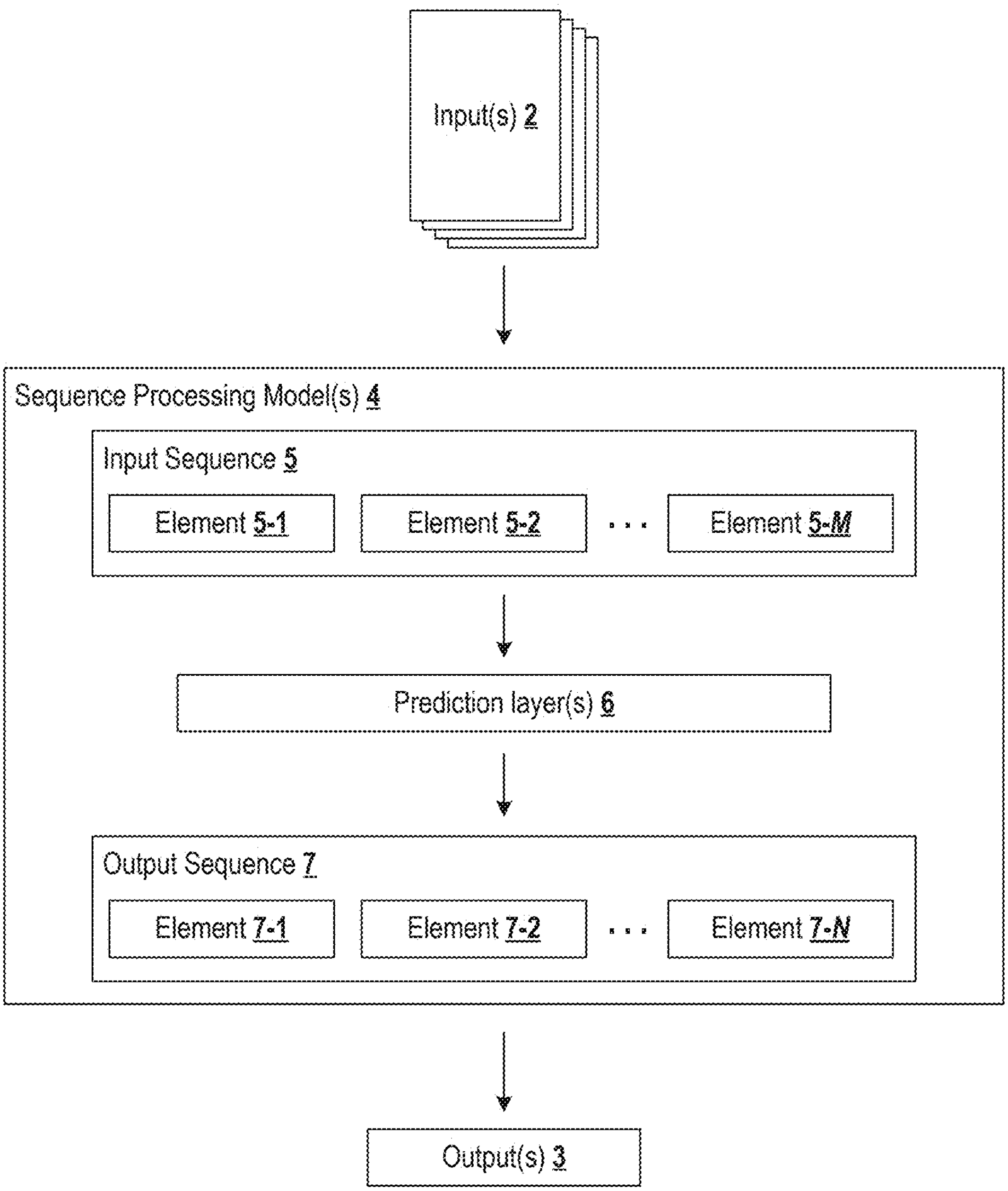
FIG. 7 is a block diagram of an example sequence processing model according to example implementations of aspects of the present disclosure.

FIG. 7 is a block diagram of an example implementation of an example machine-learned model configured to process sequences of information. For instance, an example implementation of machine-learned model(s) 1 can include machine-learned sequence processing model(s) 4. An example system can pass input(s) 2 to sequence processing model(s) 4. Sequence processing model(s) 4 can include one or more machine-learned components. Sequence processing model(s) 4 can process the data from input(s) 2 to obtain an input sequence 5. Input sequence 5 can include one or more input elements 5-1, 5-2, . . . , 5-M, etc. obtained from input(s) 2. Sequence processing model 4 can process input sequence 5 using prediction layer(s) 6 to generate an output sequence 7. Output sequence 7 can include one or more output elements 7-1, 7-2, . . . , 7-N, etc. generated based on input sequence 5. The system can generate output(s) 3 based on output sequence 7.

Sequence processing model(s) 4 can include one or multiple machine-learned model components configured to ingest, generate, or otherwise reason over sequences of information. For example, some example sequence processing models are referred to as language models and can leverage language-based understandings across one or multiple modalities of input information. Sequence processing model(s) 4 can include relatively large models (e.g., more parameters, computationally expensive, etc.), which may be referred to as "Large Language Models" or LLMs. Sequence processing model(s) 4 can include relatively small models (e.g., fewer parameters, computationally lightweight, etc.), which may be referred to as "Small Language Models" or SLMs. Example language models include, for instance, models described in Gemma: Open Models Based on Gemini Research and Technology, Google, https://arxiv.org/abs/2403.08295; Gemma 2: Improving Open Language Models at a Practical Size, Google, https://arxiv.org/abs/2408.00118.

Sequence processing model(s) 4 can process one or multiple types of data simultaneously. Variations of language models that can perform joint vision and language tasks may be referred to as "Vision-Language Models," or VLMs. Example VLMs include models described in PaliGemma: A versatile 3B VLM for transfer, Google, https://arxiv.org/abs/2407.07726; PaliGemma 2: A Family of Versatile VLMs for Transfer, Google, https://arxiv.org/abs/2412.03555; Flamingo: a Visual Language Model for Few-Shot Learning, Google, https://arxiv.org/abs/2204.14198; PaLI: A Jointly-Scaled Multilingual Language-Image Model, Google, https://arxiv.org/abs/2209.06794.

Sequence processing model(s) 4 can be multimodal. Example multimodal sequence processing models include, for instance, models described in Gemini: A Family of Highly Capable Multimodal Models, Google, https://arxiv.org/abs/2312.11805; Gemini 1.5: Unlocking multimodal understanding across millions of tokens of context, Google, https://arxiv.org/abs/2403.05530.

Other example sequence processing models can operate to generate outputs or receive inputs in specific domains, such as image domains, see, e.g., Dosovitskiy et al., *An Image is Worth* 16×16 *Words: Transformers for Image Recognition at Scale,* arXiv:2010.11929v2 (Jun. 3, 2021), audio domains, see, e.g., Agostinelli et al., *MusicLM: Generating Music From Text,* arXiv:2301.11325v1 (Jan. 26, 2023), biochemical domains, see, e.g., Jumper et al., Highly accurate protein structure prediction with AlphaFold, 596 Nature 583 (Aug. 26, 2021), by way of example.

In general, sequence processing model(s) 4 can obtain input sequence 5 using data from input(s) 2. For instance, input sequence 5 can include a representation of data from input(s) 2 in a format understood by sequence processing model(s) 4. One or more machine-learned components of sequence processing model(s) 4 can ingest the data from input(s) 2, parse the data into pieces compatible with the processing architectures of sequence processing model(s) 4 (e.g., via "tokenization"), and project the pieces into an input space associated with prediction layer(s) 6 (e.g., via "embedding").

Sequence processing model(s) 4 can ingest the data from input(s) 2 and parse the data into a sequence of elements to obtain input sequence 5. For example, a portion of input data from input(s) 2 can be broken down into pieces that collectively represent the content of the portion of the input data. The pieces can provide the elements of the sequence.

Elements 5-1, 5-2, . . . , 5-M can represent, in some cases, building blocks for capturing or expressing meaningful information in a particular data domain. For instance, the elements can describe "atomic units" across one or more domains. For example, for textual input source(s), the elements can correspond to groups of one or more words or sub-word components, such as sets of one or more characters.

For example, elements 5-1, 5-2, . . . , 5-M can represent tokens obtained using a tokenizer. For instance, a tokenizer can process a given portion of an input source and output a series of tokens (e.g., corresponding to input elements 5-1, 5-2, . . . , 5-M) that represent the portion of the input source. Various approaches to tokenization can be used. For instance, textual input source(s) can be tokenized using a byte-pair encoding (BPE) technique. See, e.g., Kudo et al., *SentencePiece: A simple and language independent subword tokenizer and detokenizer for Neural Text Processing*, PROCEEDINGS OF THE 2018 CONFERENCE ON EMPIRICAL METHODS IN NATURAL LANGUAGE PROCESSING (System Demonstrations), pages 66-71 (Oct. 31-Nov. 4, 2018), https://aclanthology.org/D18-2012.pdf. Image-based input source (s) can be tokenized by extracting and serializing patches from an image.

In general, arbitrary data types can be serialized and processed into input sequence 5. It is to be understood that element(s) 5-1, 5-2, . . . , 5-M depicted in FIG. 7 can be the tokens or can be the embedded representations thereof.

Prediction layer(s) 6 can predict one or more output elements 7-1, 7-2, . . . , 7-N based on the input elements. Prediction layer(s) 6 can include one or more machine-learned model architectures, such as one or more layers of learned parameters that manipulate and transform the input(s) to extract higher-order meaning from, and relationships between, input element(s) 5-1, 5-2, . . . , 5-M. In this manner, for instance, example prediction layer(s) 6 can predict new output element(s) in view of the context provided by input sequence 5.

Prediction layer(s) 6 can evaluate associations between portions of input sequence 5 and a particular output element. These associations can inform a prediction of the likelihood that a particular output follows the input context. For example, consider the textual snippet, "The carpenter's toolbox was small and heavy. It was full of ______." Example prediction layer(s) 6 can identify that "It" refers back to "toolbox" by determining a relationship between the respective embeddings. Example prediction layer(s) 6 can also link "It" to the attributes of the toolbox, such as "small" and "heavy." Based on these associations, prediction layer(s) 6 can, for instance, assign a higher probability to the word "nails" than to the word "sawdust."

A transformer is an example architecture that can be used in prediction layer(s) 4. See, e.g., Vaswani et al., *Attention Is All You Need,* ARXIV:1706.03762v7 (Aug. 2, 2023). A transformer is an example of a machine-learned model architecture that uses an attention mechanism to compute associations between items within a context window. The context window can include a sequence that contains input sequence 5 and potentially one or more output element(s) 7-1, 7-2, . . . , 7-N. A transformer block can include one or more attention layer(s) and one or more post-attention layer(s) (e.g., feedforward layer(s), such as a multi-layer perceptron).

Prediction layer(s) 6 can include other machine-learned model architectures in addition to or in lieu of transformer-based architectures. For example, recurrent neural networks (RNNs) and long short-term memory (LSTM) models can also be used, as well as convolutional neural networks (CNNs). In general, prediction layer(s) 6 can leverage various kinds of artificial neural networks that can understand or generate sequences of information.

Output sequence 7 can include or otherwise represent the same or different data types as input sequence 5. For instance, input sequence 5 can represent textual data, and output sequence 7 can represent textual data. Input sequence 5 can represent image, audio, or audiovisual data, and output sequence 7 can represent textual data (e.g., describing the image, audio, or audiovisual data). It is to be understood that prediction layer(s) 6, and any other interstitial model components of sequence processing model(s) 4, can be configured to receive a variety of data types in input sequence(s) 5 and output a variety of data types in output sequence(s) 7.

Output sequence 7 can have various relationships to input sequence 5. Output sequence 7 can be a continuation of input sequence 5. Output sequence 7 can be complementary to input sequence 5. Output sequence 7 can translate, transform, augment, or otherwise modify input sequence 5. Output sequence 7 can answer, evaluate, confirm, or otherwise respond to input sequence 5. Output sequence 7 can implement (or describe instructions for implementing) an instruction provided via input sequence 5.

Output sequence 7 can be generated autoregressively. For instance, for some applications, an output of one or more prediction layer(s) 6 can be passed through one or more output layers (e.g., softmax layer) to obtain a probability distribution over an output vocabulary (e.g., a textual or symbolic vocabulary) conditioned on a set of input elements in a context window. In this manner, for instance, output sequence 7 can be autoregressively generated by sampling a likely next output element, adding that element to the context window, and re-generating the probability distribution based on the updated context window, and sampling a likely next output element, and so forth.

Output sequence 7 can also be generated non-autoregressively. For instance, multiple output elements of output sequence 7 can be predicted together without explicit sequential conditioning on each other. See, e.g., Saharia et al., Non-Autoregressive Machine Translation with Latent Alignments, ARXIV:2004.07437v3 (Nov. 16, 2020).

Output sequence 7 can include one or multiple portions or elements. In an example content generation configuration, output sequence 7 can include multiple elements corresponding to multiple portions of a generated output sequence (e.g., a textual sentence, values of a discretized waveform, computer code, etc.). In an example classification configuration, output sequence 7 can include a single element associated with a classification output. For instance, an output "vocabulary" can include a set of classes into which an input sequence is to be classified. For instance, a vision transformer block can pass latent state information to a multilayer perceptron that outputs a likely class value associated with an input image.

Figure 8:
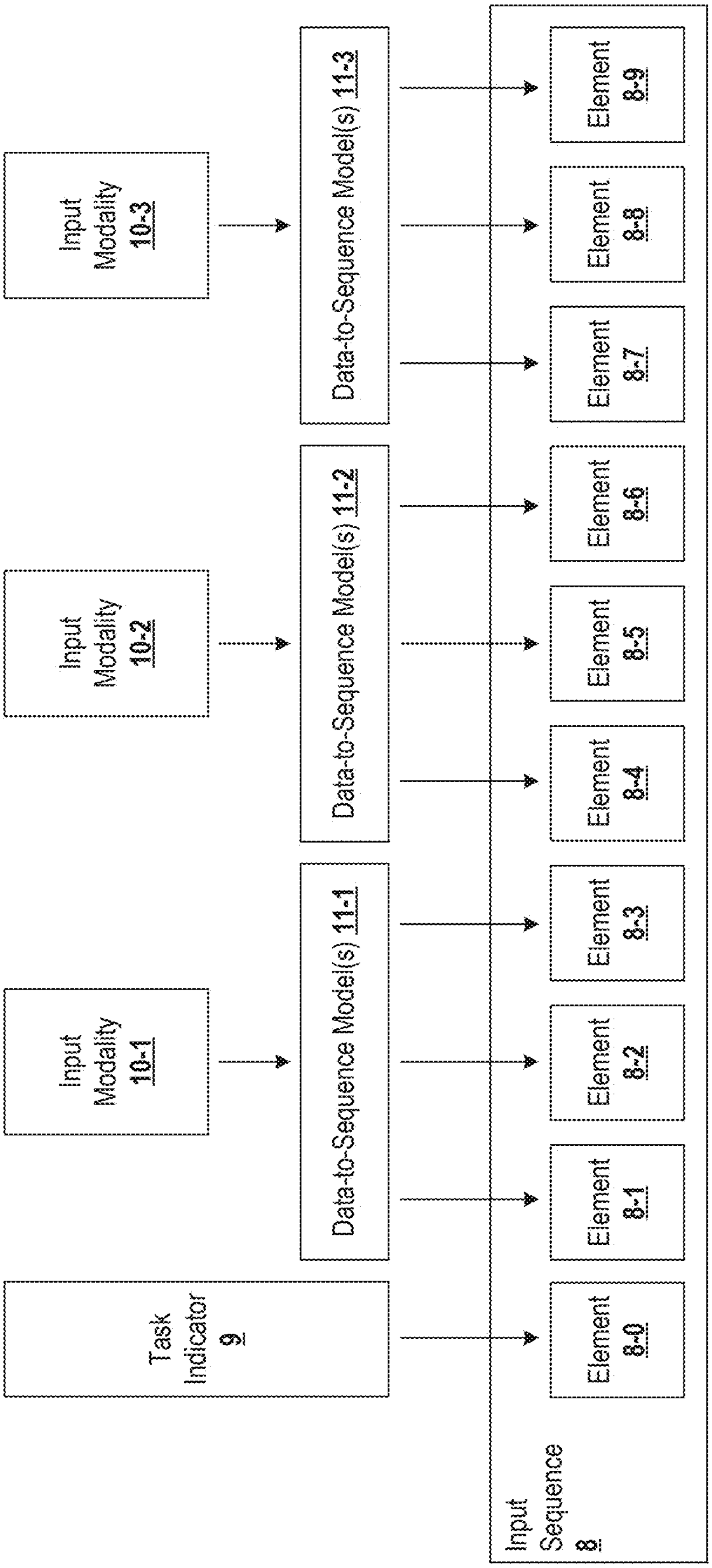
FIG. 8 is a block diagram of an example technique for populating an example input sequence for processing by a sequence processing model according to example implementations of aspects of the present disclosure.

FIG. 8 is a block diagram of an example technique for populating an example input sequence 8. Input sequence 8 can include various functional elements that form part of the model infrastructure, such as an element 8-0 obtained from a task indicator 9 that signals to any model(s) that process input sequence 8 that a particular task is being performed (e.g., to help adapt a performance of the model(s) to that particular task). Input sequence 8 can include various data elements from different data modalities. For instance, an input modality 10-1 can include one modality of data. A data-to-sequence model 11-1 can process data from input modality 10-1 to project the data into a format compatible with input sequence 8 (e.g., one or more vectors dimensioned according to the dimensions of input sequence 8) to obtain elements 8-1, 8-2, 8-3. Another input modality 10-2 can include a different modality of data. A data-to-sequence model 11-2 can project data from input modality 10-2 into a format compatible with input sequence 8 to obtain elements 8-4, 8-5, 8-6. Another input modality 10-3 can include yet another different modality of data. A data-to-sequence model 11-3 can project data from input modality 10-3 into a format compatible with input sequence 8 to obtain elements 8-7, 8-8, 8-9.

Input sequence 8 can be the same as or different from input sequence 5. Input sequence 8 can be a multimodal input sequence that contains elements that represent data from different modalities using a common dimensional representation. For instance, an embedding space can have P dimensions. Input sequence 8 can be configured to contain a plurality of elements that have P dimensions. In this manner, for instance, example implementations can facilitate information extraction and reasoning across diverse data modalities by projecting data into elements in the same embedding space for comparison, combination, or other computations therebetween.

For example, elements 8-0, . . . , 8-9 can indicate particular locations within a multidimensional embedding space. Some elements can map to a set of discrete locations in the embedding space. For instance, elements that correspond to discrete members of a predetermined vocabulary of tokens can map to discrete locations in the embedding space that are associated with those tokens. Other elements can be continuously distributed across the embedding space. For instance, some data types can be broken down into continuously defined portions (e.g., image patches) that can be described using continuously distributed locations within the embedding space.

In some implementations, the expressive power of the embedding space may not be limited to meanings associated with any particular set of tokens or other building blocks. For example, a continuous embedding space can encode a spectrum of high-order information. An individual piece of information (e.g., a token) can map to a particular point in that space: for instance, a token for the word "dog" can be projected to an embedded value that points to a particular location in the embedding space associated with canine-related information. Similarly, an image patch of an image of a dog on grass can also be projected into the embedding space. In some implementations, the projection of the image of the dog can be similar to the projection of the word "dog" while also having similarity to a projection of the word "grass," while potentially being different from both. In some implementations, the projection of the image patch may not exactly align with any single projection of a single word. In some implementations, the projection of the image patch can align with a combination of the projections of the words "dog" and "grass." In this manner, for instance, a high-order embedding space can encode information that can be independent of data modalities in which the information is expressed.

Task indicator 9 can include a model or model component configured to identify a task being performed and inject, into input sequence 8, an input value represented by element 8-0 that signals which task is being performed. For instance, the input value can be provided as a data type associated with an input modality and projected along with that input modality (e.g., the input value can be a textual task label that is embedded along with other textual data in the input; the input value can be a pixel-based representation of a task that is embedded along with other image data in the input; etc.). The input value can be provided as a data type that differs from or is at least independent from other input(s). For instance, the input value represented by element 8-0 can be learned within a continuous embedding space.

Input modalities 10-1, 10-2, and 10-3 can be associated with various different data types (e.g., as described above with respect to input(s) 2 and output(s) 3).

Data-to-sequence models 11-1, 11-2, and 11-3 can be the same or different from each other. Data-to-sequence models 11-1, 11-2, and 11-3 can be adapted to each respective input modality 10-1, 10-2, and 10-3. For example, a textual data-to-sequence model can subdivide a portion of input text and project the subdivisions into element(s) in input sequence 8 (e.g., elements 8-1, 8-2, 8-3, etc.). An image data-to-sequence model can subdivide an input image and project the subdivisions into element(s) in input sequence 8 (e.g., elements 8-4, 8-5, 8-6, etc.). An arbitrary data type data-to-sequence model can subdivide an input of that arbitrary data type and project the subdivisions into element (s) in input sequence 8 (e.g., elements 8-7, 8-8, 8-9, etc.).

Data-to-sequence models 11-1, 11-2, and 11-3 can form part of machine-learned sequence processing model(s) 4. Data-to-sequence models 11-1, 11-2, and 11-3 can be jointly trained with or trained independently from machine-learned sequence processing model(s) 4. Data-to-sequence models 11-1, 11-2, and 11-3 can be trained end-to-end with machine-learned sequence processing model(s) 4.

Figure 9:
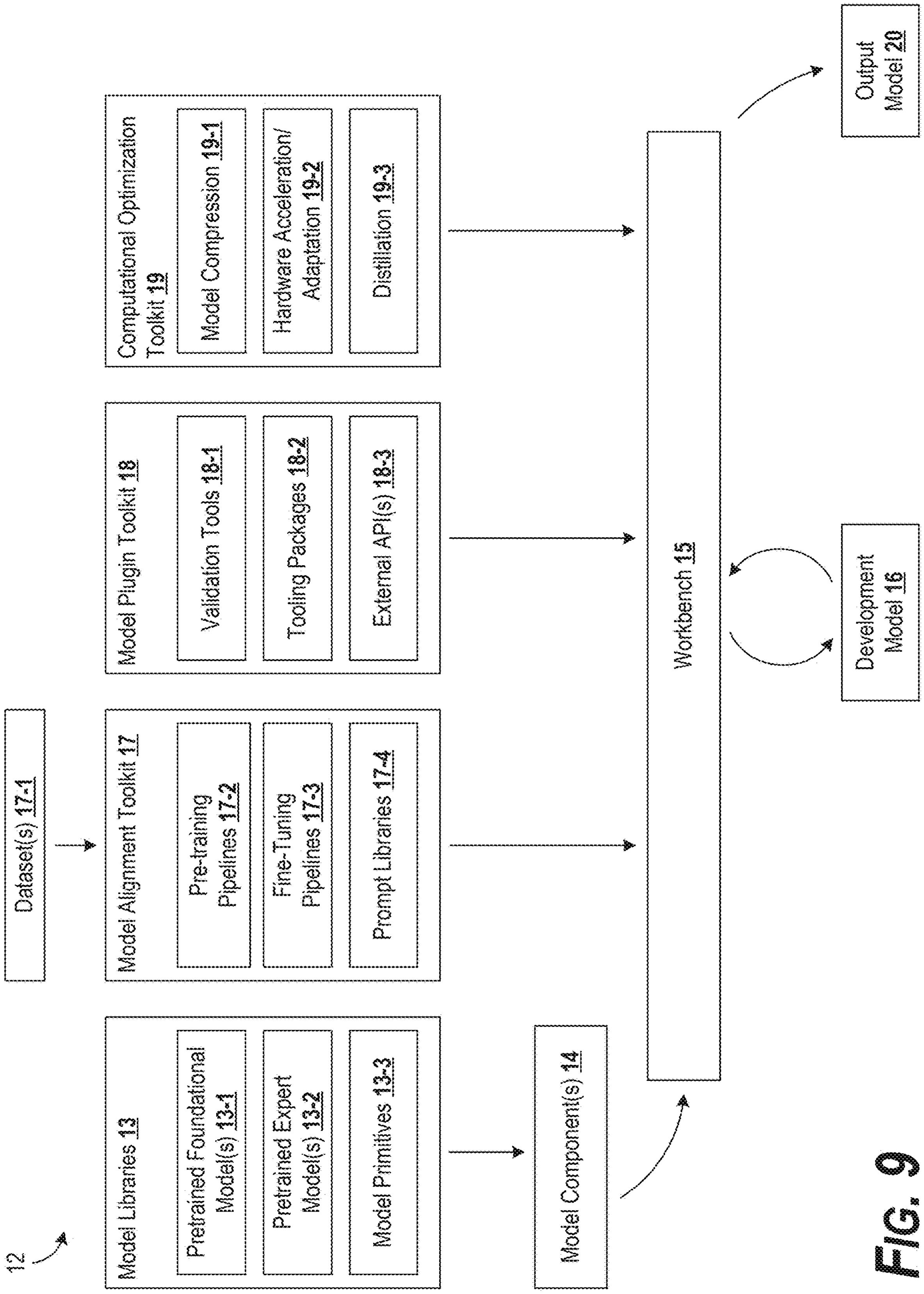
FIG. 9 is a block diagram of an example model development platform according to example implementations of aspects of the present disclosure.

FIG. 9 is a block diagram of an example model development platform 12 that can facilitate creation, adaptation, and refinement of example machine-learned models (e.g., machine-learned model(s) 1, sequence processing model(s) 4, etc.). Model development platform 12 can provide a number of different toolkits that developer systems can employ in the development of new or adapted machine-learned models.

Model development platform 12 can provide one or more model libraries 13 containing building blocks for new models. Model libraries 13 can include one or more pre-trained foundational models 13-1, which can provide a backbone of processing power across various tasks. Model libraries 13 can include one or more pre-trained expert models 13-2, which can be focused on performance in particular domains of expertise. Model libraries 13 can include various model primitives 13-3, which can provide low-level architectures or components (optionally pre-trained), which can be assembled in various arrangements as desired. Model primitives 13-3 can include a library of pre-trained adapters or LoRA modules that can adapt a baseline foundational model to align its outputs with a desired performance profile, augment model capabilities (e.g., to adapt to a different input modality, etc.), and the like.

Model development platform 12 can receive selections of various model components 14. Model development platform 12 can pass selected model components 14 to a workbench 15 that combines selected model components 14 into a development model 16.

Workbench 15 can facilitate further refinement and adaptation of development model 16 by leveraging a number of different toolkits integrated with model development platform 12. For example, workbench 15 can facilitate alignment of the development model 16 with a desired performance profile on various tasks using a model alignment toolkit 17.

Model alignment toolkit 17 can provide a number of tools for causing development model 16 to generate outputs aligned with desired behavioral characteristics. Alignment can include increasing the accuracy, precision, recall, etc. of model outputs. Alignment can include enforcing output styles, schema, or other preferential characteristics of model outputs. Alignment can be general or domain-specific. For instance, a pre-trained foundational model 13-1 can begin with an initial level of performance across multiple domains. Alignment of the pre-trained foundational model 13-1 can include improving a performance in a particular domain of information or tasks (e.g., even at the expense of performance in another domain of information or tasks).

Model alignment toolkit 17 can integrate one or more dataset(s) 17-1 for aligning development model 16. Curated dataset(s) 17-1 can include labeled or unlabeled training data. Dataset(s) 17-1 can be obtained from public domain datasets. Dataset(s) 17-1 can be obtained from private datasets associated with one or more developer system(s) for the alignment of bespoke machine-learned model(s) customized for private use-cases.

Pre-training pipelines 17-2 can include a machine-learned model training workflow configured to update development model 16 over large-scale, potentially noisy datasets. For example, pre-training can leverage unsupervised learning techniques (e.g., de-noising, etc.) to process large numbers of training instances to update model parameters from an initialized state and achieve a desired baseline performance. Pre-training pipelines 17-2 can leverage unlabeled datasets in dataset(s) 17-1 to perform pre-training. Workbench 15 can implement a pre-training pipeline 17-2 to pre-train development model 16.

Fine-tuning pipelines 17-3 can include a machine-learned model training workflow configured to refine the model parameters of development model 16 with higher-quality data. Fine-tuning pipelines 17-3 can update development model 16 by conducting supervised training with labeled dataset(s) in dataset(s) 17-1. Fine-tuning pipelines 17-3 can update development model 16 by conducting reinforcement learning using reward signals from user feedback signals. Workbench 15 can implement a fine-tuning pipeline 17-3 to fine-tune development model 16.

Prompt libraries 17-4 can include sets of inputs configured to induce behavior aligned with desired performance criteria. Prompt libraries 17-4 can include few-shot prompts (e.g., inputs providing examples of desired model outputs for prepending to a desired runtime query), chain-of-thought prompts (e.g., inputs providing step-by-step reasoning within the exemplars to facilitate thorough reasoning by the model), and the like.

Example prompts can be retrieved from an available repository of prompt libraries 17-4. Example prompts can be contributed by one or more developer systems using workbench 15.

In some implementations, pre-trained or fine-tuned models can achieve satisfactory performance without exemplars in the inputs. For instance, zero-shot prompts can include inputs that lack exemplars. Zero-shot prompts can be within a domain within a training dataset or outside of the training domain(s).

Prompt libraries 17-4 can include one or more prompt engineering tools. Prompt engineering tools can provide workflows for retrieving or learning optimized prompt values. Prompt engineering tools can facilitate directly learning prompt values (e.g., input element values) based on one or more training iterations. Workbench 15 can implement prompt engineering tools in development model 16.

Prompt libraries 17-4 can include pipelines for prompt generation. For example, inputs can be generated using development model 16 itself or other machine-learned models. In this manner, for instance, a first model can process information about a task and output an input for a second model to process in order to perform a step of the task. The second model can be the same as or different from the first model. Workbench 15 can implement prompt generation pipelines in development model 16.

Prompt libraries 17-4 can include pipelines for context injection. For instance, a performance of development model 16 on a particular task can improve if provided with additional context for performing the task. Prompt libraries 17-4 can include software components configured to identify desired context, retrieve the context from an external source (e.g., a database, a sensor, etc.), and add the context to the input prompt. Workbench 15 can implement context injection pipelines in development model 16.

Although various training examples described herein with respect to model development platform 12 refer to "pre-training" and "fine-tuning," it is to be understood that model alignment toolkit 17 can generally support a wide variety of training techniques adapted for training a wide variety of machine-learned models. Example training techniques can correspond to the example training method 500 described above.

Model development platform 12 can include a model plugin toolkit 18. Model plugin toolkit 18 can include a variety of tools configured for augmenting the functionality of a machine-learned model by integrating the machine-learned model with other systems, devices, and software components. For instance, a machine-learned model can use tools to increase performance quality where appropriate. For instance, deterministic tasks can be offloaded to dedicated tools in lieu of probabilistically performing the task with an increased risk of error. For instance, instead of autoregressively predicting the solution to a system of equations, a machine-learned model can recognize a tool to call for obtaining the solution and pass the system of equations to the appropriate tool. The tool can be a traditional system of equations solver that can operate deterministically to resolve the system of equations. The output of the tool can be returned in response to the original query. In this manner, tool use can allow some example models to focus on the strengths of machine-learned models—e.g., understanding an intent in an unstructured request for a task—while augmenting the performance of the model by offloading certain tasks to a more focused tool for rote application of deterministic algorithms to a well-defined problem.

Model plugin toolkit 18 can include validation tools 18-1. Validation tools 18-1 can include tools that can parse and confirm output(s) of a machine-learned model. Validation tools 18-1 can include engineered heuristics that establish certain thresholds applied to model outputs. For example, validation tools 18-1 can ground the outputs of machine-learned models to structured data sources (e.g., to mitigate "hallucinations").

Model plugin toolkit 18 can include tooling packages 18-2 for implementing one or more tools that can include scripts or other executable code that can be executed alongside development model 16. Tooling packages 18-2 can include one or more inputs configured to cause machine-learned model(s) to implement the tools (e.g., few-shot prompts that induce a model to output tool calls in the proper syntax, etc.). Tooling packages 18-2 can include, for instance, fine-tuning training data for training a model to use a tool.

Model plugin toolkit 18 can include interfaces for calling external application programming interfaces (APIs) 18-3. For instance, in addition to or in lieu of implementing tool calls or tool code directly with development model 16, development model 16 can be aligned to output instructions that initiate API calls to send or obtain data via external systems.

Model plugin toolkit 18 can integrate with prompt libraries 17-4 to build a catalog of available tools for use with development model 16. For instance, a model can receive, in an input, a catalog of available tools, and the model can generate an output that selects a tool from the available tools and initiates a tool call for using the tool.

Model development platform 12 can include a computational optimization toolkit 19 for optimizing a computational performance of development model 16. For instance, tools for model compression 19-1 can allow development model 16 to be reduced in size while maintaining a desired level of performance. For instance, model compression 19-1 can include quantization workflows, weight pruning and sparsification techniques, etc. Tools for hardware acceleration 19-2 can facilitate the configuration of the model storage and execution formats to operate optimally on different hardware resources. For instance, hardware acceleration 19-2 can include tools for optimally sharding models for distributed processing over multiple processing units for increased bandwidth, lower unified memory requirements, etc. Tools for distillation 19-3 can provide for the training of lighter-weight models based on the knowledge encoded in development model 16. For instance, development model 16 can be a highly performant, large machine-learned model optimized using model development platform 12. To obtain a lightweight model for running in resource-constrained environments, a smaller model can be a "student model" that learns to imitate development model 16 as a "teacher model." In this manner, for instance, the investment in learning the parameters and configurations of development model 16 can be efficiently transferred to a smaller model for more efficient inference.

Workbench 15 can implement one, multiple, or none of the toolkits implemented in model development platform 12. Workbench 15 can output an output model 20 based on development model 16. Output model 20 can be a deployment version of development model 16. Output model 20 can be a development or training checkpoint of development model 16. Output model 20 can be a distilled, compressed, or otherwise optimized version of development model 16.

Figure 10:
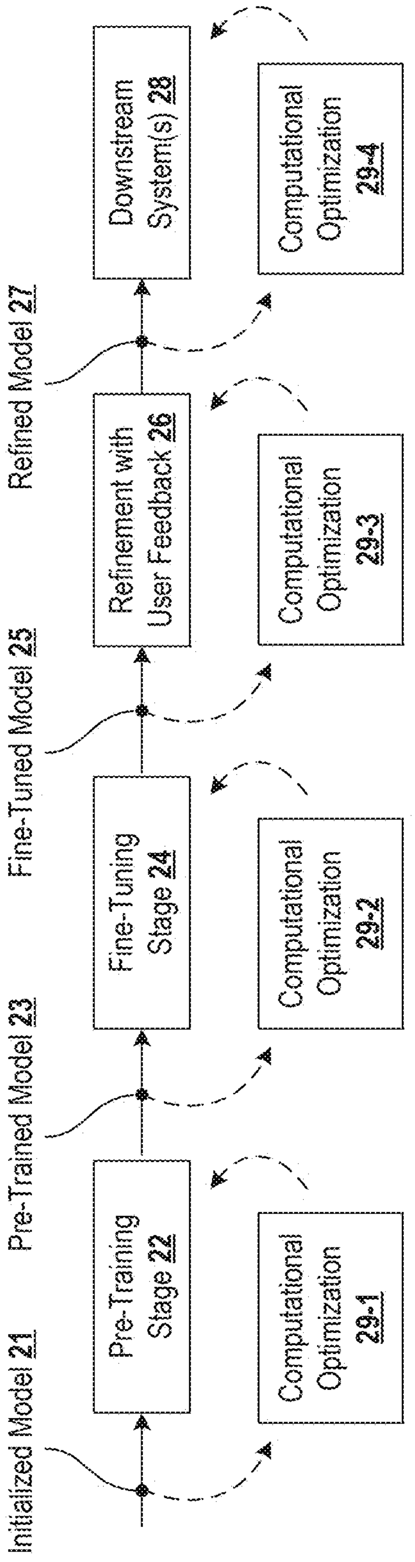
FIG. 10 is a block diagram of an example training workflow for training a machine-learned model according to example implementations of aspects of the present disclosure.

FIG. 10 is a block diagram of an example training flow for training a machine-learned development model 16. One or more portion(s) of the example training flow can be implemented by a computing system that includes one or more computing devices such as, for example, computing systems described with reference to the other figures. Each respective portion of the example training flow can be performed by any (or any combination) of one or more computing devices. Moreover, one or more portion(s) of the example training flow can be implemented on the hardware components of the device(s) described herein, for example, to train one or more systems or models. FIG. 10 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 10 is described with reference to elements/terms described with respect to other systems and figures for exemplary illustrated purposes and is not meant to be limiting. One or more portions of the example training flow can be performed additionally, or alternatively, by other systems.

Initially, development model 16 can persist in an initial state as an initialized model 21. Development model 16 can be initialized with weight values. Initial weight values can be random or based on an initialization schema. Initial weight values can be based on prior pre-training for the same or for a different model.

Initialized model 21 can undergo pre-training in a pre-training stage 22. Pre-training stage 22 can be implemented using one or more pre-training pipelines 17-2 over data from dataset(s) 17-1. Pre-training can be omitted, for example, if initialized model 21 is already pre-trained (e.g., development model 16 contains, is, or is based on a pre-trained foundational model or an expert model).

Pre-trained model 23 can then be a new version of development model 16, which can persist as development model 16 or as a new development model. Pre-trained model 23 can be the initial state if development model 16 was already pre-trained. Pre-trained model 23 can undergo fine-tuning in a fine-tuning stage 24. Fine-tuning stage 24 can be implemented using one or more fine-tuning pipelines 17-3 over data from dataset(s) 17-1. Fine-tuning can be omitted, for example, if a pre-trained model has satisfactory performance, if the model was already fine-tuned, or if other tuning approaches are preferred.

Fine-tuned model 29 can then be a new version of development model 16, which can persist as development model 16 or as a new development model. Fine-tuned model 29 can be the initial state if development model 16 was already fine-tuned. Fine-tuned model 29 can undergo refinement with user feedback 26. For instance, refinement with user feedback 26 can include reinforcement learning, optionally based on human feedback from human users of fine-tuned model 25. As reinforcement learning can be a form of fine-tuning, it is to be understood that fine-tuning stage 24 can subsume the stage for refining with user feedback 26. Refinement with user feedback 26 can produce a refined model 27. Refined model 27 can be output to downstream system(s) 28 for deployment or further development.

In some implementations, computational optimization operations can be applied before, during, or after each stage. For instance, initialized model 21 can undergo computational optimization 29-1 (e.g., using computational optimization toolkit 19) before pre-training stage 22. Pre-trained model 23 can undergo computational optimization 29-2 (e.g., using computational optimization toolkit 19) before fine-tuning stage 24. Fine-tuned model 25 can undergo computational optimization 29-3 (e.g., using computational optimization toolkit 19) before refinement with user feedback 26. Refined model 27 can undergo computational optimization 29-4 (e.g., using computational optimization toolkit 19) before output to downstream system(s) 28. Computational optimization(s) 29-1, . . . , 29-4 can all be the same, all be different, or include at least some different optimization techniques.

Figure 11:
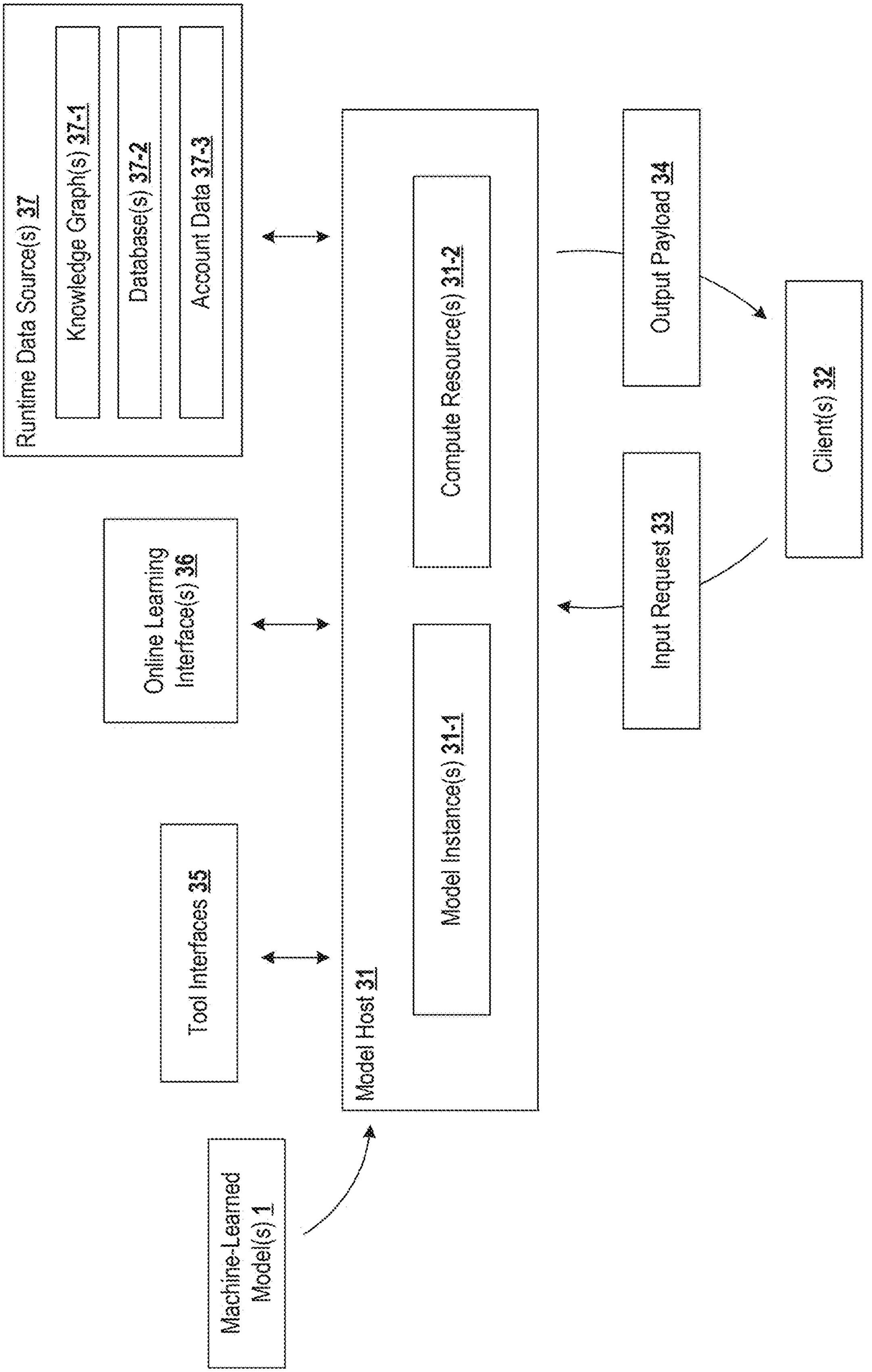
FIG. 11 is a block diagram of an inference system for operating one or more machine-learned model(s) to perform inference according to example implementations of aspects of the present disclosure.

FIG. 11 is a block diagram of an inference system for operating one or more machine-learned model(s) 1 to perform inference (e.g., for training, for deployment, etc.). A model host 31 can receive machine-learned model(s) 1. Model host 31 can host one or more model instance(s) 31-1, which can be one or multiple instances of one or multiple models. Model host 31 can host model instance(s) 31-1 using available compute resources 31-2 associated with model host 31.

Model host 31 can perform inference on behalf of one or more client(s) 32. Client(s) 32 can transmit an input request 33 to model host 31. Using input request 33, model host 31 can obtain input(s) 2 for input to machine-learned model(s) 1. Machine-learned model(s) 1 can process input(s) 2 to generate output(s) 3. Using output(s) 3, model host 31 can return an output payload 34 for responding to input request 33 from client(s) 32. Output payload 34 can include or be based on output(s) 3.

Model host 31 can leverage various other resources and tools to augment the inference task. For instance, model host 31 can communicate with tool interfaces 35 to facilitate tool use by model instance(s) 31-1. Tool interfaces 35 can include local or remote APIs. Tool interfaces 35 can include integrated scripts or other software functionality. Model host 31 can engage online learning interface(s) 36 to facilitate ongoing improvements to machine-learned model(s) 1. For instance, online learning interface(s) 36 can be used within reinforcement learning loops to retrieve user feedback on inferences served by model host 31. Model host 31 can access runtime data source(s) 37 for augmenting input(s) 2 with additional contextual information. For instance, runtime data source(s) 37 can include a knowledge graph 37-1 that facilitates structured information retrieval for information associated with input request(s) 33 (e.g., a search engine service). Runtime data source(s) 37 can include public or private, external or local database(s) 37-2 that can store information associated with input request(s) 33 for augmenting input(s) 2. Runtime data source(s) 37 can include account data 37-3 which can be retrieved in association with a user account corresponding to a client 32 for customizing the behavior of model host 31 accordingly.

Model host 31 can be implemented by one or multiple computing devices or systems. Client(s) 2 can be implemented by one or multiple computing devices or systems, which can include computing devices or systems shared with model host 31.

For example, model host 31 can operate on a server system that provides a machine-learning service to client device(s) that operate client(s) 32 (e.g., over a local or wide-area network). Client device(s) can be end-user devices used by individuals. Client device(s) can be server systems that operate client(s) 32 to provide various functionality as a service to downstream end-user devices.

In some implementations, model host 31 can operate on the same device or system as client(s) 32. Model host 31 can be a machine-learning service that runs on-device to provide machine-learning functionality to one or multiple applications operating on a client device, which can include an application implementing client(s) 32. Model host 31 can be a part of the same application as client(s) 32. For instance, model host 31 can be a subroutine or method implemented by one part of an application, and client(s) 32 can be another subroutine or method that engages model host 31 to perform inference functions within the application. It is to be understood that model host 31 and client(s) 32 can have various different configurations.

Model instance(s) 31-1 can include one or more machine-learned models that are available for performing inference. Model instance(s) 31-1 can include weights or other model components that are stored in persistent storage, temporarily cached, or loaded into high-speed memory. Model instance(s) 31-1 can include multiple instance(s) of the same model (e.g., for parallel execution of more requests on the same model). Model instance(s) 31-1 can include instance(s) of different model(s). Model instance(s) 31-1 can include cached intermediate states of active or inactive model(s) used to accelerate inference of those models. For instance, an inference session with a particular model may generate significant amounts of computational results that can be re-used for future inference runs (e.g., using a KV cache for transformer-based models). These computational results can be saved in association with that inference session so that session can be executed more efficiently when resumed.

Compute resource(s) 31-2 can include one or more processors (central processing units, graphical processing units, tensor processing units, machine-learning accelerators, etc.) connected to one or more memory devices. Compute resource(s) 31-2 can include a dynamic pool of available resources shared with other processes. Compute resource(s) 31-2 can include memory devices large enough to fit an entire model instance in a single memory instance. Compute resource(s) 31-2 can also shard model instance(s) across multiple memory devices (e.g., using data parallelization or tensor parallelization, etc.). This can be done to increase parallelization or to execute a large model using multiple memory devices which individually can not be able to fit the entire model into memory.

Input request 33 can include data for input(s) 2. Model host 31 can process input request 33 to obtain input(s) 2. Input(s) 2 can be obtained directly from input request 33 or can be retrieved using input request 33. Input request 33 can be submitted to model host 31 via an API.

Model host 31 can perform inference over batches of input requests 33 in parallel. For instance, a model instance 31-1 can be configured with an input structure that has a batch dimension. Separate input(s) 2 can be distributed across the batch dimension (e.g., rows of an array). The separate input(s) 2 can include completely different contexts. The separate input(s) 2 can be multiple inference steps of the same task. The separate input(s) 2 can be staggered in an input structure, such that any given inference cycle can be operating on different portions of the respective input(s) 2. In this manner, for instance, model host 31 can perform inference on the batch in parallel, such that output(s) 3 can also contain the batch dimension and return the inference results for the batched input(s) 2 in parallel. In this manner, for instance, batches of input request(s) 33 can be processed in parallel for higher throughput of output payload(s) 34.

Output payload 34 can include or be based on output(s) 3 from machine-learned model(s) 1. Model host 31 can process output(s) 3 to obtain output payload 34. This can include chaining multiple rounds of inference (e.g., iteratively, recursively, across the same model(s) or different model(s)) to arrive at a final output for a task to be returned in output payload 34. Output payload 34 can be transmitted to client(s) 32 via an API.

Online learning interface(s) 36 can facilitate reinforcement learning of machine-learned model(s) 1. Online learning interface(s) 36 can facilitate reinforcement learning with human feedback (RLHF). Online learning interface(s) 36 can facilitate federated learning of machine-learned model(s) 1.

Model host 31 can access a library of pre-trained adapters or LoRA modules that can adapt a baseline model to align its outputs with a desired performance profile, augment model capabilities (e.g., to adapt to a different input modality, etc.), and the like. For instance, model host 31 can receive an input request to load a customized model, and model host 31 can retrieve one or more components to adapt a baseline model to the custom profile. Model host 31 can determine that a particular functionality is needed for a particular task (e.g., based on an output of a model that preprocesses an input) and retrieve a pre-trained component accordingly.

Model host 31 can execute machine-learned model(s) 1 to perform inference for various tasks using various types of data. For example, various different input(s) 2 and output(s) 3 can be used for various different tasks. In some implementations, input(s) 2 can be or otherwise represent image data. Machine-learned model(s) 1 can process the image data to generate an output. As an example, machine-learned model(s) 1 can process the image data to generate an image recognition output (e.g., a recognition of the image data, a latent embedding of the image data, an encoded representation of the image data, a hash of the image data, etc.). As another example, machine-learned model(s) 1 can process the image data to generate an image segmentation output. As another example, machine-learned model(s) 1 can process the image data to generate an image classification output. As another example, machine-learned model(s) 1 can process the image data to generate an image data modification output (e.g., an alteration of the image data, etc.). As another example, machine-learned model(s) 1 can process the image data to generate an encoded image data output (e.g., an encoded and/or compressed representation of the image data, etc.). As another example, machine-learned model(s) 1 can process the image data to generate an upscaled image data output. As another example, machine-learned model(s) 1 can process the image data to generate a prediction output.

In some implementations, the task is a computer vision task. In some cases, input(s) 2 includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some implementations, input(s) 2 can be or otherwise represent natural language data. Machine-learned model(s) 1 can process the natural language data to generate an output. As an example, machine-learned model(s) 1 can process the natural language data to generate a language encoding output. As another example, machine-learned model(s) 1 can process the natural language data to generate a latent text embedding output. As another example, machine-learned model(s) 1 can process the natural language data to generate a translation output. As another example, machine-learned model(s) 1 can process the natural language data to generate a classification output. As another example, machine-learned model(s) 1 can process the natural language data to generate a textual segmentation output. As another example, machine-learned model(s) 1 can process the natural language data to generate a semantic intent output. As another example, machine-learned model(s) 1 can process the natural language data to generate an upscaled text or natural language output (e.g., text or natural language data that is higher quality than the input text or natural language, etc.). As another example, machine-learned model(s) 1 can process the natural language data to generate a prediction output (e.g., one or more predicted next portions of natural language content).

In some implementations, input(s) 2 can be or otherwise represent speech data (e.g., data describing spoken natural language, such as audio data, textual data, etc.). Machine-learned model(s) 1 can process the speech data to generate an output. As an example, machine-learned model(s) 1 can process the speech data to generate a speech recognition output. As another example, machine-learned model(s) 1 can process the speech data to generate a speech translation output. As another example, machine-learned model(s) 1 can process the speech data to generate a latent embedding output. As another example, machine-learned model(s) 1 can process the speech data to generate an encoded speech output (e.g., an encoded and/or compressed representation of the speech data, etc.). As another example, machine-learned model(s) 1 can process the speech data to generate an upscaled speech output (e.g., speech data that is higher quality than the input speech data, etc.). As another example, machine-learned model(s) 1 can process the speech data to generate a textual representation output (e.g., a textual representation of the input speech data, etc.). As another example, machine-learned model(s) 1 can process the speech data to generate a prediction output.

In some implementations, input(s) 2 can be or otherwise represent latent encoding data (e.g., a latent space representation of an input, etc.). Machine-learned model(s) 1 can process the latent encoding data to generate an output. As an example, machine-learned model(s) 1 can process the latent encoding data to generate a recognition output. As another example, machine-learned model(s) 1 can process the latent encoding data to generate a reconstruction output. As another example, machine-learned model(s) 1 can process the latent encoding data to generate a search output. As another example, machine-learned model(s) 1 can process the latent encoding data to generate a reclustering output. As another example, machine-learned model(s) 1 can process the latent encoding data to generate a prediction output.

In some implementations, input(s) 2 can be or otherwise represent statistical data. Statistical data can be, represent, or otherwise include data computed and/or calculated from some other data source. Machine-learned model(s) 1 can process the statistical data to generate an output. As an example, machine-learned model(s) 1 can process the statistical data to generate a recognition output. As another example, machine-learned model(s) 1 can process the statistical data to generate a prediction output. As another example, machine-learned model(s) 1 can process the statistical data to generate a classification output. As another example, machine-learned model(s) 1 can process the statistical data to generate a segmentation output. As another example, machine-learned model(s) 1 can process the statistical data to generate a visualization output. As another example, machine-learned model(s) 1 can process the statistical data to generate a diagnostic output.

In some implementations, input(s) 2 can be or otherwise represent sensor data. Machine-learned model(s) 1 can process the sensor data to generate an output. As an example, machine-learned model(s) 1 can process the sensor data to generate a recognition output. As another example, machine-learned model(s) 1 can process the sensor data to generate a prediction output. As another example, machine-learned model(s) 1 can process the sensor data to generate a classification output. As another example, machine-learned model(s) 1 can process the sensor data to generate a segmentation output. As another example, machine-learned model(s) 1 can process the sensor data to generate a visualization output. As another example, machine-learned model(s) 1 can process the sensor data to generate a diagnostic output. As another example, machine-learned model(s) 1 can process the sensor data to generate a detection output.

In some implementations, machine-learned model(s) 1 can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g.

one or more images or videos), the output comprises compressed visual data, and the task is a visual data compression task. In another example, the task may comprise generating an embedding for input data (e.g. input audio or visual data). In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

In some implementations, the task is a generative task, and machine-learned model(s) 1 can be configured to output content generated in view of input(s) 2. For instance, input(s) 2 can be or otherwise represent data of one or more modalities that encodes context for generating additional content.

In some implementations, the task can be a text completion task. Machine-learned model(s) 1 can be configured to process input(s) 2 that represent textual data and to generate output(s) 3 that represent additional textual data that completes a textual sequence that includes input(s) 2. For instance, machine-learned model(s) 1 can be configured to generate output(s) 3 to complete a sentence, paragraph, or portion of text that follows from a portion of text represented by input(s) 2.

In some implementations, the task can be an instruction-following task. Machine-learned model(s) 1 can be configured to process input(s) 2 that represent instructions to perform a function and to generate output(s) 3 that advance a goal of satisfying the instruction function (e.g., at least a step of a multi-step procedure to perform the function). Output(s) 3 can represent data of the same or of a different modality as input(s) 2. For instance, input(s) 2 can represent textual data (e.g., natural language instructions for a task to be performed) and machine-learned model(s) 1 can process input(s) 2 to generate output(s) 3 that represent textual data responsive to the instructions (e.g., natural language responses, programming language responses, machine language responses, etc.). Input(s) 2 can represent image data (e.g., image-based instructions for a task to be performed, optionally accompanied by textual instructions) and machine-learned model(s) 1 can process input(s) 2 to generate output(s) 3 that represent textual data responsive to the instructions (e.g., natural language responses, programming language responses, machine language responses, etc.). One or more output(s) 3 can be iteratively or recursively generated to sequentially process and accomplish steps toward accomplishing the requested functionality. For instance, an initial output can be executed by an external system or be processed by machine-learned model(s) 1 to complete an initial step of performing a function. Multiple steps can be performed, with a final output being obtained that is responsive to the initial instructions.

In some implementations, the task can be a question answering task. Machine-learned model(s) 1 can be configured to process input(s) 2 that represent a question to answer and to generate output(s) 3 that advance a goal of returning an answer to the question (e.g., at least a step of a multi-step procedure to perform the function). Output(s) 3 can represent data of the same or of a different modality as input(s) 2. For instance, input(s) 2 can represent textual data (e.g., natural language instructions for a task to be performed) and machine-learned model(s) 1 can process input(s) 2 to generate output(s) 3 that represent textual data responsive to the question (e.g., natural language responses, programming language responses, machine language responses, etc.). Input(s) 2 can represent image data (e.g., image-based instructions for a task to be performed, optionally accompanied by textual instructions) and machine-learned model(s) 1 can process input(s) 2 to generate output(s) 3 that represent textual data responsive to the question (e.g., natural language responses, programming language responses, machine language responses, etc.). One or more output(s) 3 can be iteratively or recursively generated to sequentially process and accomplish steps toward answering the question. For instance, an initial output can be executed by an external system or be processed by machine-learned model(s) 1 to complete an initial step of obtaining an answer to the question (e.g., querying a database, performing a computation, executing a script, etc.). Multiple steps can be performed, with a final output being obtained that is responsive to the question.

In some implementations, the task can be an image generation task. Machine-learned model(s) 1 can be configured to process input(s) 2 that represent context regarding a desired portion of image content. The context can include text data, image data, audio data, etc. Machine-learned model(s) 1 can be configured to generate output(s) 3 that represent image data that depicts imagery related to the context. For instance, machine-learned model(s) 1 can be configured to generate pixel data of an image. Values for channel(s) associated with the pixels in the pixel data can be selected based on the context (e.g., based on a probability determined based on the context).

In some implementations, the task can be an audio generation task. Machine-learned model(s) 1 can be configured to process input(s) 2 that represent context regarding a desired portion of audio content. The context can include text data, image data, audio data, etc. Machine-learned model(s) 1 can be configured to generate output(s) 3 that represent audio data related to the context. For instance, machine-learned model(s) 1 can be configured to generate waveform data in the form of an image (e.g., a spectrogram). Values for channel(s) associated with pixels of the image can be selected based on the context. Machine-learned model(s) 1 can be configured to generate waveform data in the form of a sequence of discrete samples of a continuous waveform. Values of the sequence can be selected based on the context (e.g., based on a probability determined based on the context).

In some implementations, the task can be a data generation task. Machine-learned model(s) 1 can be configured to process input(s) 2 that represent context regarding a desired portion of data (e.g., data from various data domains, such as sensor data, image data, multimodal data, statistical data, etc.). The desired data can be, for instance, synthetic data for training other machine-learned models. The context can include arbitrary data type(s). Machine-learned model(s) 1 can be configured to generate output(s) 3 that represent data that aligns with the desired data. For instance, machine-learned model(s) 1 can be configured to generate data values for populating a dataset. Values for the data object(s) can be selected based on the context (e.g., based on a probability determined based on the context).

Figure 12:
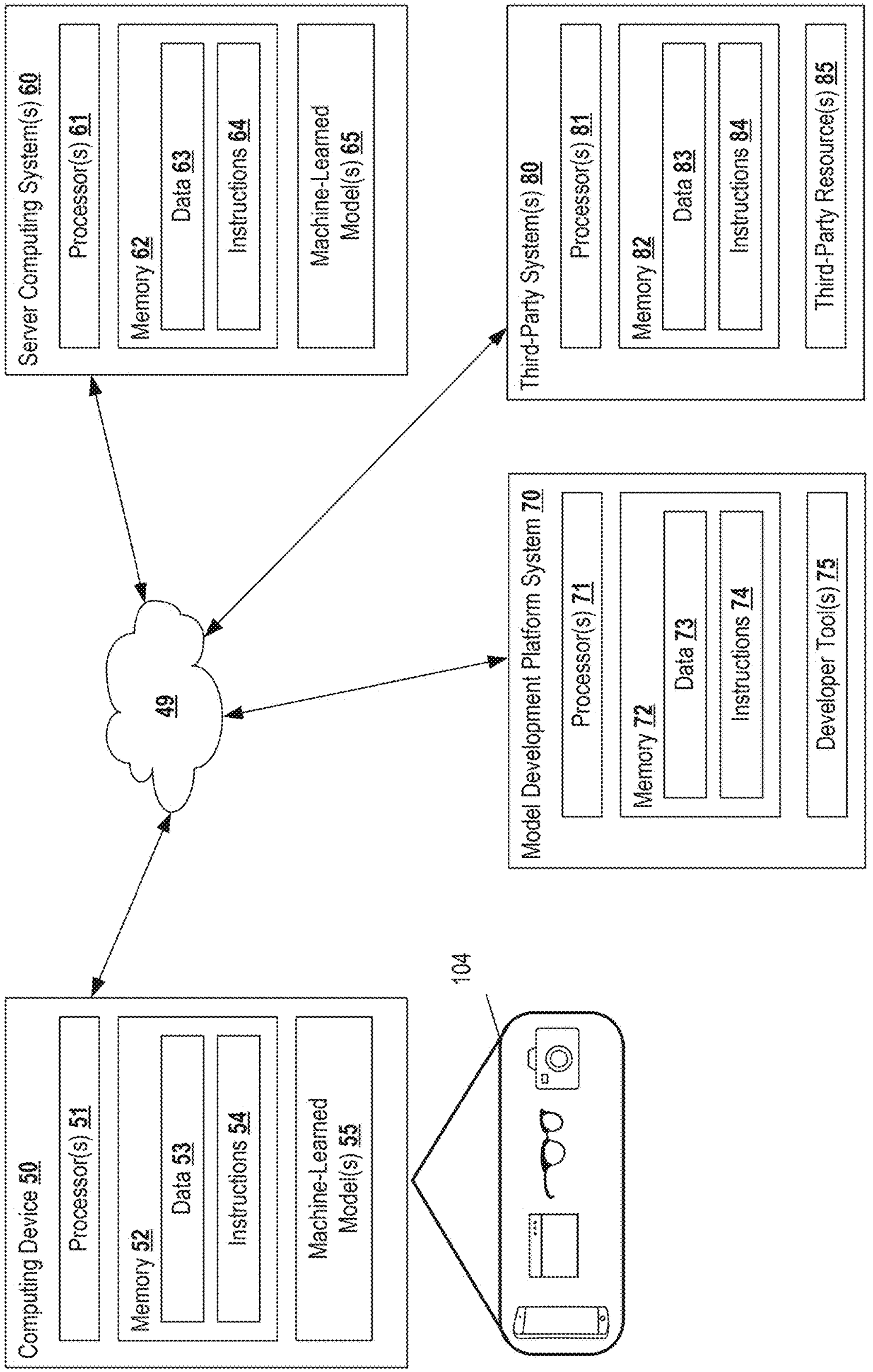
FIG. 12 is a block diagram of an example networked computing system according to example implementations of aspects of the present disclosure.

FIG. 12 is a block diagram of an example networked computing system that can perform aspects of example implementations of the present disclosure. For example, the system illustrated in FIG. 12 can cooperatively operate to implement some or all of the example query response system illustrated in FIG. 1. The system can include a number of computing devices and systems that are communicatively coupled over a network 49. An example computing device 50 is described to provide an example of a computing device that can perform any aspect of the present disclosure (e.g., implementing model host 31, client(s) 32, or both). An example server computing system 60 is described as an example of a server computing system that can perform any aspect of the present disclosure (e.g., implementing model host 31, client(s) 32, or both). Computing device 50 and server computing system(s) 60 can cooperatively interact (e.g., over network 49) to perform any aspect of the present disclosure (e.g., implementing model host 31, client(s) 32, or both). Model development platform system 70 is an example system that can host or serve model development platform(s) 12 for development of machine-learned models. Third-party system(s) 80 are example system(s) with which any of computing device 50, server computing system(s) 60, or model development platform system(s) 70 can interact in the performance of various aspects of the present disclosure (e.g., engaging third-party tools, accessing third-party databases or other resources, etc.).

Network 49 can be any type of communications network, such as a local area network (e.g., intranet), wide area network (e.g., Internet), or some combination thereof and can include any number of wired or wireless links. In general, communication over network 49 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL). Network 49 can also be implemented via a system bus. For instance, one or more devices or systems of FIG. 12 can be co-located with, contained by, or otherwise integrated into one or more other devices or systems.

Computing device 50 can be any type of computing device, such as, for example, a personal computing device (e.g., laptop or desktop), a mobile computing device (e.g., smartphone or tablet), a gaming console or controller, a wearable computing device, an embedded computing device, a server computing device, a virtual machine operating on a host device, or any other type of computing device. Computing device 50 can be a client computing device. Computing device 50 can be an end-user computing device. Computing device 50 can be a computing device of a service provided that provides a service to an end user (who may use another computing device to interact with computing device 50).

Computing device 50 can include one or more processors 51 and a memory 52. Processor(s) 51 can be any suitable processing device (e.g., a processor core, a microprocessor, an ASIC, an FPGA, a controller, a microcontroller, etc.) and can be one processor or a plurality of processors that are operatively connected. Memory 52 can include one or more non-transitory computer-readable storage media, such as HBM, RAM, ROM, EEPROM, EPROM, flash memory devices, magnetic disks, etc., and combinations thereof. Memory 52 can store data 53 and instructions 54 which can be executed by processor(s) 51 to cause computing device 50 to perform operations. The operations can implement any one or multiple features described herein. The operations can implement example methods and techniques described herein.

In some implementations, the computing device 50 may include, be, and/or be part of, a user computing device 104. The user computing device 104 may include a mobile computing device (e.g., a smartphone or tablet), a desktop computer, a laptop computer, a smart wearable, and/or a smart appliance. Additionally and/or alternatively, the computing device 50 may obtain from, and/or generate data with, the one or more one or more user computing devices 104. For example, a camera of a smartphone may be utilized to capture image data descriptive of the environment, and/or an overlay application of the user computing device 104 can be utilized to track and/or process the data being provided to the user. Similarly, one or more sensors associated with a smart wearable may be utilized to obtain data about a user and/or about a user's environment (e.g., image data can be obtained with a camera housed in a user's smart glasses). Additionally and/or alternatively, the data may be obtained and uploaded from other user devices that may be specialized for data obtainment or generation.

Computing device 50 can also include one or more input components that receive user input. For example, a user input component can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, camera, LIDAR, a physical keyboard or other buttons, or other means by which a user can provide user input.

Computing device 50 can store or include one or more machine-learned models 55. Machine-learned models 55 can include one or more machine-learned model(s) 1, such as a sequence processing model 4. Machine-learned models 55 can include one or multiple model instance(s) 31-1. Machine-learned model(s) 55 can be received from server computing system(s) 60, model development platform system 70, third party system(s) 80 (e.g., an application distribution platform), or developed locally on computing device 50. Machine-learned model(s) 55 can be loaded into memory 52 and used or otherwise implemented by processor (s) 51. Computing device 50 can implement multiple parallel instances of machine-learned model(s) 55.

Server computing system(s) 60 can include one or more processors 61 and a memory 62. Processor(s) 61 can be any suitable processing device (e.g., a processor core, a microprocessor, an ASIC, an FPGA, a controller, a microcontroller, etc.) and can be one processor or a plurality of processors that are operatively connected. Memory 62 can include one or more non-transitory computer-readable storage media, such as HBM, RAM, ROM, EEPROM, EPROM, flash memory devices, magnetic disks, etc., and combinations thereof. Memory 62 can store data 63 and instructions 64 which can be executed by processor(s) 61 to cause server computing system(s) 60 to perform operations. The operations can implement any one or multiple features described herein. The operations can implement example methods and techniques described herein.

In some implementations, server computing system 60 includes or is otherwise implemented by one or multiple server computing devices. In instances in which server computing system 60 includes multiple server computing devices, such server computing devices can operate according to sequential computing architectures, parallel computing architectures, or some combination thereof.

Server computing system 60 can store or otherwise include one or more machine-learned models 65. Machine-learned model(s) 65 can be the same as or different from machine-learned model(s) 55. Machine-learned models 65 can include one or more machine-learned model(s) 1, such as a sequence processing model 4. Machine-learned models 65 can include one or multiple model instance(s) 31-1. Machine-learned model(s) 65 can be received from computing device 50, model development platform system 70, third party system(s) 80, or developed locally on server computing system(s) 60. Machine-learned model(s) 65 can be loaded into memory 62 and used or otherwise implemented by processor(s) 61. Server computing system(s) 60 can implement multiple parallel instances of machine-learned model(s) 65.

In an example configuration, machine-learned models 65 can be included in or otherwise stored and implemented by server computing system 60 to establish a client-server relationship with computing device 50 for serving model inferences. For instance, server computing system(s) 60 can implement model host 31 on behalf of client(s) 32 on computing device 50. For instance, machine-learned models 65 can be implemented by server computing system 60 as a portion of a web service (e.g., remote machine-learned model hosting service, such as an online interface for performing machine-learned model operations over a network on server computing system(s) 60). For instance, server computing system(s) 60 can communicate with computing device 50 over a local intranet or internet connection. For instance, computing device 50 can be a workstation or endpoint in communication with server computing system(s) 60, with implementation of machine-learned models 65 being managed by server computing system(s) 60 to remotely perform inference (e.g., for runtime or training operations), with output(s) returned (e.g., cast, streamed, etc.) to computing device 50. Machine-learned models 65 can work cooperatively or interoperatively with machine-learned models 55 on computing device 50 to perform various tasks.

Model development platform system(s) 70 can include one or more processors 71 and a memory 72. Processor(s) 71 can be any suitable processing device (e.g., a processor core, a microprocessor, an ASIC, an FPGA, a controller, a microcontroller, etc.) and can be one processor or a plurality of processors that are operatively connected. Memory 72 can include one or more non-transitory computer-readable storage media, such as HBM, RAM, ROM, EEPROM, EPROM, flash memory devices, magnetic disks, etc., and combinations thereof. Memory 72 can store data 73 and instructions 74 which can be executed by processor(s) 71 to cause model development platform system(s) 70 to perform operations. The operations can implement any one or multiple features described herein. The operations can implement example methods and techniques described herein. Example operations include the functionality described herein with respect to model development platform 12. This and other functionality can be implemented by developer tool(s) 75.

Third-party system(s) 80 can include one or more processors 81 and a memory 82. Processor(s) 81 can be any suitable processing device (e.g., a processor core, a microprocessor, an ASIC, an FPGA, a controller, a microcontroller, etc.) and can be one processor or a plurality of processors that are operatively connected. Memory 82 can include one or more non-transitory computer-readable storage media, such as HBM, RAM, ROM, EEPROM, EPROM, flash memory devices, magnetic disks, etc., and combinations thereof. Memory 82 can store data 83 and instructions 84 which can be executed by processor(s) 81 to cause third-party system(s) 80 to perform operations. The operations can implement any one or multiple features described herein. The operations can implement example methods and techniques described herein. Example operations include the functionality described herein with respect to tools and other external resources called when training or performing inference with machine-learned model(s) 1, 4, 16, 20, 55, 65, etc. (e.g., third-party resource(s) 85).

FIG. 12 illustrates one example arrangement of computing systems that can be used to implement the present disclosure. Other computing system configurations can be used as well. For example, in some implementations, one or both of computing system 50 or server computing system(s) 60 can implement all or a portion of the operations of model development platform system 70. For example, computing system 50 or server computing system(s) 60 can implement developer tool(s) 75 (or extensions thereof) to develop, update/train, or refine machine-learned models 1, 4, 16, 20, 55, 65, etc. using one or more techniques described herein with respect to model alignment toolkit 17. In this manner, for instance, computing system 50 or server computing system(s) 60 can develop, update/train, or refine machine-learned models based on local datasets (e.g., for model personalization/customization, as permitted by user data preference selections).

Figure 13:
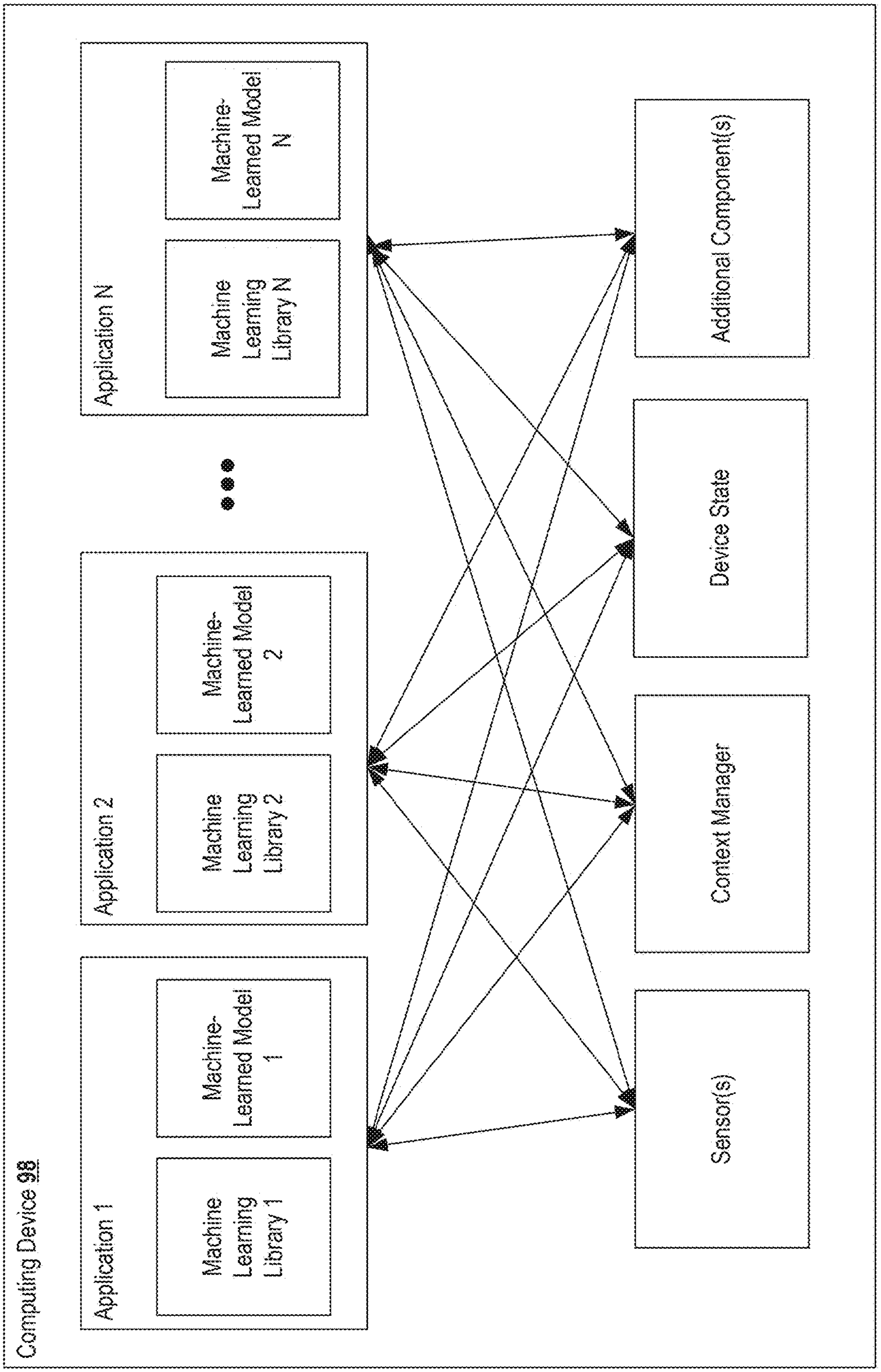
FIG. 13 is a block diagram of an example computing device according to example implementations of aspects of the present disclosure.

FIG. 13 is a block diagram of an example computing device 98 that performs according to example embodiments of the present disclosure. Computing device 98 can be a user computing device or a server computing device (e.g., computing device 50, server computing system(s) 60, etc.). Computing device 98 can implement model host 31. For instance, computing device 98 can include a number of applications (e.g., applications 1 through N). Each application can contain its own machine learning library and machine-learned model(s). For example, each application can include a machine-learned model. Example applications include a text messaging application, an email application, a dictation application, a virtual keyboard application, a browser application, etc. As illustrated in FIG. 13, each application can communicate with a number of other components of the computing device, such as, for example, one or more sensors, a context manager, a device state component, or additional components. In some implementations, each application can communicate with each device component using an API (e.g., a public API). In some implementations, the API used by each application is specific to that application.

Figure 14:
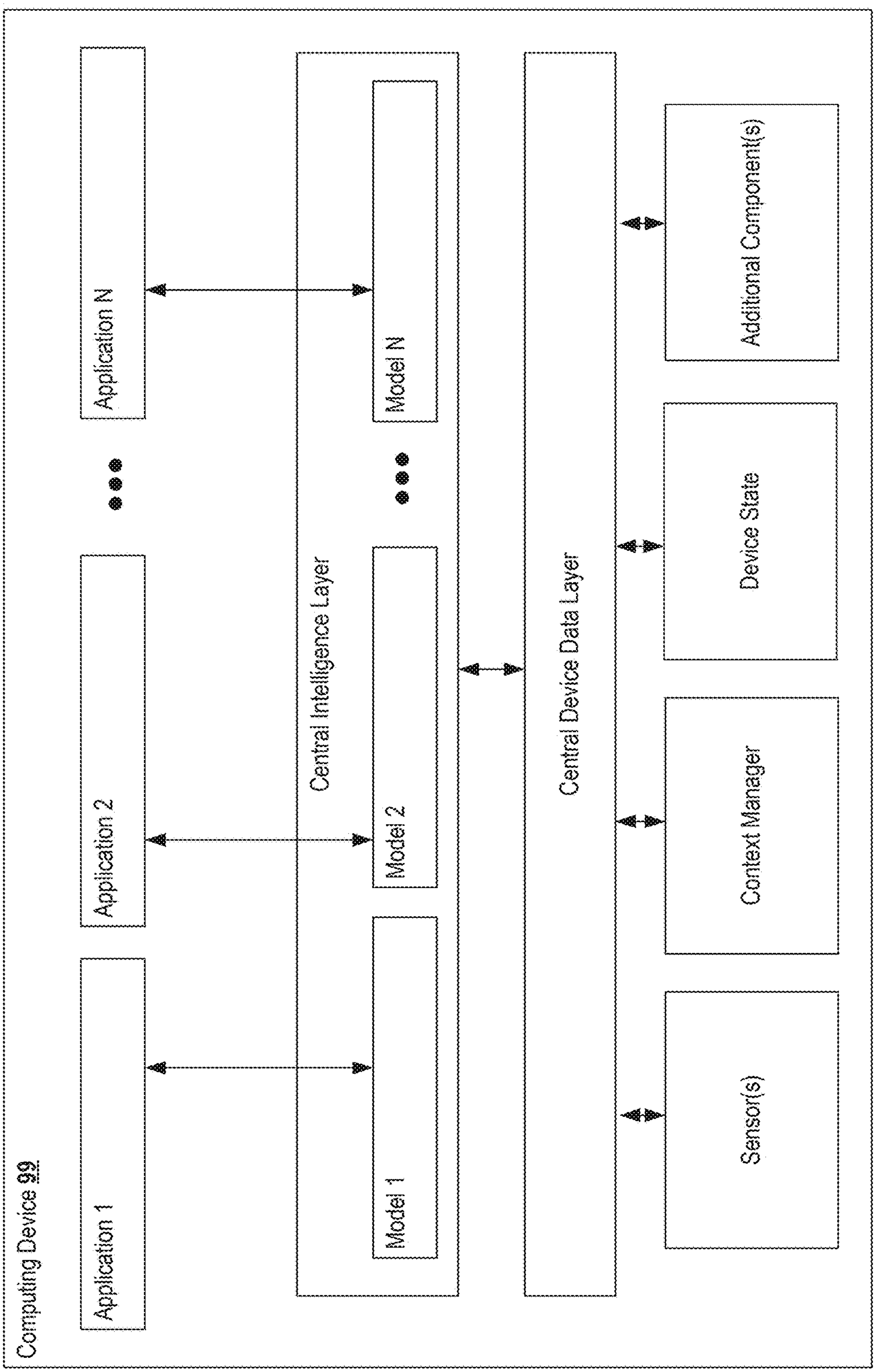
FIG. 14 is a block diagram of an example computing device according to example implementations of aspects of the present disclosure.

FIG. 14 is a block diagram of an example computing device 99 that performs according to example embodiments of the present disclosure. Computing device 99 can be the same as or different from computing device 98. Computing device 99 can be a user computing device or a server computing device (e.g., computing device 50, server computing system(s) 60, etc.). Computing device 98 can implement model host 31. For instance, computing device 99 can include a number of applications (e.g., applications 1 through N). Each application can be in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example, as illustrated in FIG. 14, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of computing device 99.

The central intelligence layer can communicate with a central device data layer. The central device data layer can be a centralized repository of data for computing device 99. As illustrated in FIG. 14, the central device data layer can communicate with a number of other components of the computing device, such as, for example, one or more sensors, a context manager, a device state component, or additional components. In some implementations, the central device data layer can communicate with each device component using an API (e.g., a private API).

Figure 15:
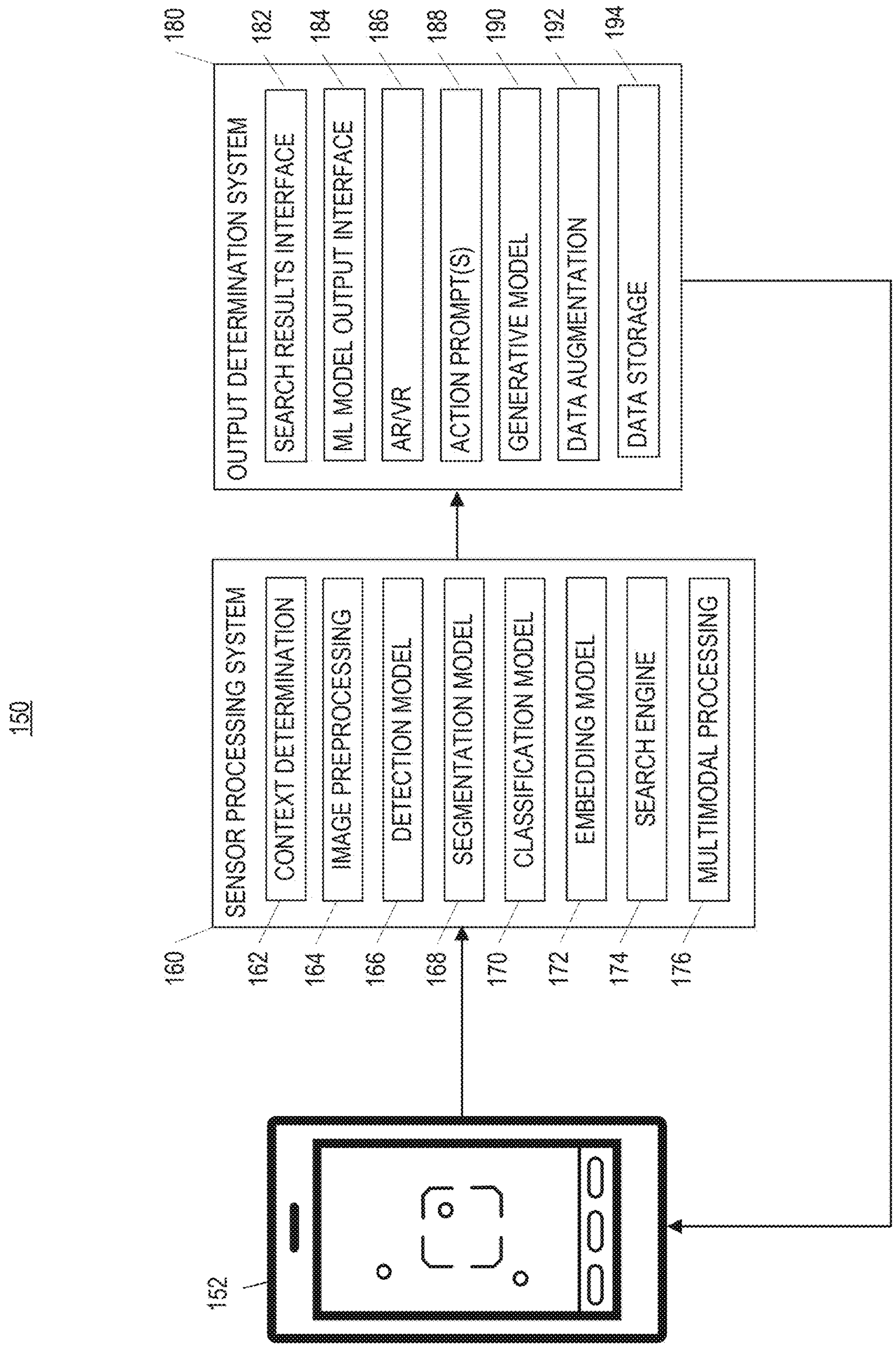
FIG. 15 is a block diagram of an example computing system according to example implementations of aspects of the present disclosure.

FIG. 15 depicts a block diagram of an example computing system 150 that performs visual searches and/or query response generation according to example embodiments of the present disclosure. In particular, the example computing system 150 can include one or more computing devices 152 that can be utilized to obtain, and/or generate, one or more datasets that can be processed by a sensor processing system 160 and/or an output determination system 180 to feedback to a user that can provide information on features in the one or more obtained datasets. The one or more datasets can include image data, text data, audio data, multimodal data, latent encoding data, etc. The one or more datasets may be obtained via one or more sensors associated with the one or more computing devices 152 (e.g., one or more sensors in the computing device 152). Additionally and/or alternatively, the one or more datasets can be stored data and/or retrieved data (e.g., data retrieved from a web resource). For example, images, text, and/or other content items may be interacted with by a user. The interacted-with content items can then be utilized to generate one or more determinations.

The one or more computing devices 152 can obtain, and/or generate, one or more datasets based on image capture, sensor tracking, data storage retrieval, content download (e.g., downloading an image or other content item via the internet from a web resource), and/or via one or more other techniques. The one or more datasets can be processed with a sensor processing system 160. The sensor processing system 160 may perform one or more processing techniques using one or more machine-learned models, one or more search engines, and/or one or more other processing techniques. The one or more processing techniques can be performed in any combination and/or individually. The one or more processing techniques can be performed in series and/or in parallel. In particular, the one or more datasets can be processed with a context determination block 162, which may determine a context associated with one or more content items. The context determination block 162 may identify and/or process metadata, user profile data (e.g., preferences, user search history, user browsing history, user purchase history, and/or user input data), previous interaction data, global trend data, location data, time data, and/or other data to determine a particular context associated with the user. The context can be associated with an event, a determined trend, a particular action, a particular type of data, a particular environment, and/or another context associated with the user and/or the retrieved or obtained data.

The sensor processing system 160 may include an image preprocessing block 164. The image preprocessing block 164 may be utilized to adjust one or more values of an obtained and/or received image to prepare the image to be processed by one or more machine-learned models and/or one or more search engines 174. The image preprocessing block 164 may resize the image, adjust saturation values, adjust resolution, strip and/or add metadata, and/or perform one or more other operations.

In some implementations, the sensor processing system 160 can include one or more machine-learned models, which may include a detection model 166, a segmentation model 168, a classification model 170, an embedding model 172, and/or one or more other machine-learned models. For example, the sensor processing system 160 may include one or more detection models 166 that can be utilized to detect particular features in the processed dataset. In particular, one or more images can be processed with the one or more detection models 166 to generate one or more bounding boxes associated with detected features in the one or more images.

Additionally and/or alternatively, one or more segmentation models 168 can be utilized to segment one or more portions of the dataset from the one or more datasets. For example, the one or more segmentation models 168 may utilize one or more segmentation masks (e.g., one or more segmentation masks manually generated and/or generated based on the one or more bounding boxes) to segment a portion of an image, a portion of an audio file, and/or a portion of text. The segmentation may include isolating one or more detected objects and/or removing one or more detected objects from an image.

The one or more classification models 170 can be utilized to process image data, text data, audio data, latent encoding data, multimodal data, and/or other data to generate one or more classifications. The one or more classification models 170 can include one or more image classification models, one or more object classification models, one or more text classification models, one or more audio classification models, and/or one or more other classification models. The one or more classification models 170 can process data to determine one or more classifications.

In some implementations, data may be processed with one or more embedding models 172 to generate one or more embeddings. For example, one or more images can be processed with the one or more embedding models 172 to generate one or more image embeddings in an embedding space. The one or more image embeddings may be associated with one or more image features of the one or more images. In some implementations, the one or more embedding models 172 may be configured to process multimodal data to generate multimodal embeddings. The one or more embeddings can be utilized for classification, search, and/or learning embedding space distributions.

The sensor processing system 160 may include one or more search engines 174 that can be utilized to perform one or more searches. The one or more search engines 174 may crawl one or more databases (e.g., one or more local databases, one or more global databases, one or more private databases, one or more public databases, one or more specialized databases, and/or one or more general databases) to determine one or more search results. The one or more search engines 174 may perform feature matching, text-based search, embedding based search (e.g., k-nearest neighbor search), metadata-based search, multimodal search, web resource search, image search, text search, and/or application search.

Additionally and/or alternatively, the sensor processing system 160 may include one or more multimodal processing blocks 176, which can be utilized to aid in the processing of multimodal data. The one or more multimodal processing blocks 176 may include generating a multimodal query and/or a multimodal embedding to be processed by one or more machine-learned models and/or one or more search engines 174.

The output(s) of the sensor processing system 160 can then be processed with an output determination system 180 to determine one or more outputs to provide to a user. The output determination system 180 may include heuristic-based determinations, machine-learned model-based determinations, user selection-based determinations, and/or context-based determinations.

The output determination system 180 may determine how and/or where to provide the one or more search results in a search results interface 182. Additionally and/or alternatively, the output determination system 180 may determine how and/or where to provide the one or more machine-learned model outputs in a machine-learned model output interface 184. In some implementations, the one or more search results and/or the one or more machine-learned model outputs may be provided for display via one or more user interface elements. The one or more user interface elements may be overlaid over displayed data. For example, one or more detection indicators may be overlaid over detected objects in a viewfinder. The one or more user interface elements may be selectable to perform one or more additional searches and/or one or more additional machine-learned model processes. In some implementations, the user interface elements may be provided as specialized user interface elements for specific applications and/or may be provided uniformly across different applications. The one or more user interface elements can include pop-up displays, interface overlays, interface tiles and/or chips, carousel interfaces, audio feedback, animations, interactive widgets, and/or other user interface elements.

Additionally and/or alternatively, data associated with the output(s) of the sensor processing system 160 may be utilized to generate and/or provide an augmented-reality experience and/or a virtual-reality experience 186. For example, the one or more obtained datasets may be processed to generate one or more augmented-reality rendering assets and/or one or more virtual-reality rendering assets, which can then be utilized to provide an augmented-reality experience and/or a virtual-reality experience 186 to a user. The augmented-reality experience may render information associated with an environment into the respective environment. Alternatively and/or additionally, objects related to the processed dataset(s) may be rendered into the user environment and/or a virtual environment. Rendering dataset generation may include training one or more neural radiance field models to learn a three-dimensional representation for one or more objects.

In some implementations, one or more action prompts 188 may be determined based on the output(s) of the sensor processing system 160. For example, a search prompt, a purchase prompt, a generate prompt, a reservation prompt, a call prompt, a redirect prompt, and/or one or more other prompts may be determined to be associated with the output(s) of the sensor processing system 160. The one or more action prompts 188 may then be provided to the user via one or more selectable user interface elements. In response to a selection of the one or more selectable user interface elements, a respective action of the respective action prompt may be performed (e.g., a search may be performed, a purchase application programming interface may be utilized, and/or another application may be opened).

In some implementations, the one or more datasets and/or the output(s) of the sensor processing system 160 may be processed with one or more generative models 190 to generate a model-generated content item that can then be provided to a user. The generation may be prompted based on a user selection and/or may be automatically performed (e.g., automatically performed based on one or more conditions, which may be associated with a threshold amount of search results not being identified).

The output determination system 180 may process the one or more datasets and/or the output(s) of the sensor processing system 160 with a data augmentation block 192 to generate augmented data. For example, one or more images can be processed with the data augmentation block 192 to generate one or more augmented images. The data augmentation can include data correction, data cropping, the removal of one or more features, the addition of one or more features, a resolution adjustment, a lighting adjustment, a saturation adjustment, and/or other augmentation.

In some implementations, the one or more datasets and/or the output(s) of the sensor processing system 160 may be stored based on a data storage block 194 determination.

The output(s) of the output determination system 180 can then be provided to a user via one or more output components of the user computing device 152. For example, one or more user interface elements associated with the one or more outputs can be provided for display via a visual display of the user computing device 152.

The processes may be performed iteratively and/or continuously. One or more user inputs to the provided user interface elements may condition and/or affect successive processing loops.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

Aspects of the disclosure have been described in terms of illustrative embodiments thereof. Any and all features in the following claims can be combined or rearranged in any way possible, including combinations of claims not explicitly enumerated in combination together, as the example claim dependencies listed herein should not be read as limiting the scope of possible combinations of features disclosed herein. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Clauses and other sequences of items joined by a particular conjunction such as "or," for example, can refer to "and/or," "at least one of", "any combination of" example elements listed therein, etc. Terms such as "based on" should be understood as "based at least in part on."

The term "can" should be understood as referring to a possibility of a feature in various implementations and not as prescribing an ability that is necessarily present in every implementation. For example, the phrase "X can perform Y" should be understood as indicating that, in various implementations, X has the potential to be configured to perform Y, and not as indicating that in every instance X must always be able to perform Y. It should be understood that, in various implementations, X can be unable to perform Y and remain within the scope of the present disclosure.

The term "may" should be understood as referring to a possibility of a feature in various implementations and not as prescribing an ability that is necessarily present in every implementation. For example, the phrase "X may perform Y" should be understood as indicating that, in various implementations, X has the potential to be configured to perform Y, and not as indicating that in every instance X must always be able to perform Y. It should be understood that, in various implementations, X can be unable to perform Y and remain within the scope of the present disclosure.

What is claimed is:

1. A computer-implemented method for responding to visual queries, the method comprising:

receiving, by a computing system comprising one or more computing devices, a query comprising one or more query images;

processing, by the computing system, the one or more query images with a visual search engine to identify, by the visual search engine, one or more context items based on the one or more query images, wherein the one or more context items comprise bounding shapes for one or more objects depicted in the one or more query images;

generating, by the computing system, one or more annotations based on the one or more context items;

annotating, by the computing system, the query with the one or more annotations to generate an annotated query, wherein annotating the query with the one or more annotations comprises overlaying the one or more bounding shapes upon at least one of the one or more query images and adding reference numbers to the one or more bounding shapes and modifying the query to contain textual references for the reference numbers; and processing, by the computing system, the annotated query with a machine-learned vision language model to generate, as an output of the machine-learned vision language model, a response to the annotated query.

2. The computer-implemented method of claim 1, wherein the visual search engine is a web-integrated visual search engine, and wherein the one or more context items comprise one or more web documents that are returned, by the web-integrated visual search engine, as results related to the one or more query images.

3. The computer-implemented method of claim 2, wherein generating the one or more annotations comprises extracting the one or more annotations from the one or more web documents.

4. The computer-implemented method of claim 1, wherein annotating the query with the one or more annotations comprises overlaying the one or more annotations upon at least one of the one or more query images.

5. The computer-implemented method of claim 1, wherein annotating the query with the one or more annotations comprises modifying the query to contain textual references to coordinate positions of one or more objects depicted in the one or more query images.

6. The computer-implemented method of claim 5, wherein the textual references to coordinate positions comprise textual references to bounding shape locations of the one or more objects depicted in the one or more query images.

7. The computer-implemented method of claim 1, wherein the one or more context items comprise object labels for one or more objects depicted in the one or more query images.

8. The computer-implemented method of claim 1, wherein:

the query comprises a multi-modal query comprising the one or more query images and textual content; and annotating the query comprises modifying the textual content based on the one or more context items.

9. The computer-implemented method of claim 8, wherein modifying the textual content based on the one or more context items comprises replacing ungrounded references within the textual content with object labels derived from the one or more query images.

10. The computer-implemented method of claim 1, wherein the machine-learned vision language model comprises a sequence processing model.

11. The computer-implemented method of claim 1, wherein the machine-learned vision language model has been trained or re-trained on training data containing annotated queries.

12. The computer-implemented method of claim 1, wherein the one or more query images comprise a query video.

13. A computing system for training a vision language model to process annotated queries, the system comprising:

one or more processors; and one or more non-transitory computer-readable media that collectively store computer-executable instructions for performing operations, the operations comprising:

obtaining a training input comprising one or more images;

processing the one or more images with a visual search engine to identify, by the visual search engine, one or more context items based on the one or more images, wherein the one or more context items comprise bounding shapes for one or more objects depicted in the one or more images;

generating one or more annotations based on the one or more context items;

annotating the training input with the one or more annotations to generate an annotated training input, wherein annotating the training input with the one or more annotations comprises overlaying the one or more bounding shapes upon at least one of the one or more images and adding reference numbers to the one or more bounding shapes and modifying the training input to contain textual references for the reference numbers;

processing the annotated training input with a vision language model to generate, as an output of the vision language model, a response to the annotated training input; and modifying one or more values of one or more parameters of the vision language model based on a loss function that evaluates the response generated by the vision language model.

14. The computer system of claim 13, wherein the visual search engine is a web-integrated visual search engine, and wherein the one or more context items comprise one or more web documents that are returned, by the web-integrated visual search engine, as results related to the one or more images.

15. The computer system of claim 14, wherein generating the one or more annotations comprises extracting the one or more annotations from the one or more web documents.

16. The computer system of claim 13, wherein annotating the training input with the one or more annotations comprises overlaying the one or more annotations upon at least one of the one or more images.

17. The computer system of claim 13, wherein the one or more annotations comprise details on spatial relationships and dimensions of objects within the one or more images.

18. The computer system of claim 17, wherein the one or more annotations associated with the details on spatial relationships and dimensions of the objects within the one or more images are in a textual form.

19. One or more non-transitory computer-readable media that collectively store instructions that, when executed by one or more computing devices, cause the one or more computing devices to perform operations, the operations comprising:

receiving a query comprising one or more query images;

processing the one or more query images with a visual search engine to identify, by the visual search engine, one or more context items based on the one or more query images, wherein the one or more context items comprise bounding shapes for one or more objects depicted in the one or more query images;

generating one or more annotations based on the one or more context items;

annotating the query with the one or more annotations to generate an annotated query, wherein annotating the query with the one or more annotations comprises overlaying the one or more bounding shapes upon at least one of the one or more query images and adding reference numbers to the one or more bounding shapes and modifying the query to contain textual references for the reference numbers; and processing the annotated query with a machine-learned vision language model to generate, as an output of the machine-learned vision language model, a response to the annotated query.

20. The one or more non-transitory computer-readable media of claim 19, wherein the machine-learned vision language model comprises a sequence processing model.

* * * * *